US011149903B2

(12) United States Patent
Darby

(10) Patent No.: US 11,149,903 B2
(45) Date of Patent: Oct. 19, 2021

(54) SUPPORT STRUCTURE TO SUPPORT AN OBJECT AT AN OPENING OF A BUILDING

(71) Applicant: Nation Wide Products LLC, Abilene, TX (US)

(72) Inventor: Jason Darby, Abilene, TX (US)

(73) Assignee: Nation Wide Products LLC, Abilene, TX (US)

( * ) Notice: Subject to any disclaimer, the term of this patent is extended or adjusted under 35 U.S.C. 154(b) by 0 days.

(21) Appl. No.: 16/575,201

(22) Filed: Sep. 18, 2019

(65) Prior Publication Data

US 2020/0088346 A1 Mar. 19, 2020

Related U.S. Application Data

(60) Provisional application No. 62/733,359, filed on Sep. 19, 2018.

(51) Int. Cl.
*F24F 1/027* (2019.01)
*F16M 13/02* (2006.01)
*F24F 13/32* (2006.01)
*A47H 27/00* (2006.01)

(52) U.S. Cl.
CPC ............. *F16M 13/02* (2013.01); *A47H 27/00* (2013.01); *F24F 13/32* (2013.01)

(58) Field of Classification Search
CPC ......... A47H 27/00; F16M 11/10; F24F 1/027; F24F 221/20; F24F 13/32; F24F 13/022; E06B 7/28; A01K 1/0353; A47L 3/02; E04G 23/00; E04G 5/00

USPC ........................................................ 248/208
See application file for complete search history.

(56) References Cited

U.S. PATENT DOCUMENTS

| | | | | |
|---|---|---|---|---|
| 399,491 | A | * | 3/1889 | Bukawietis ............... A47L 3/02 182/62 |
| 1,142,596 | A | * | 6/1915 | Mangisch ................. A47L 3/02 182/56 |
| 2,049,353 | A | * | 7/1936 | Cary ......................... A47L 3/02 182/62 |
| 2,219,642 | A | * | 10/1940 | Whiteman ................ E04G 3/18 182/60 |
| 2,273,370 | A | * | 2/1942 | Oberti ............................ 182/58 |
| 2,420,635 | A | * | 5/1947 | Workman ....................... 182/61 |
| 2,891,754 | A | * | 6/1959 | Kuhlenschmidt ....... F24F 13/32 248/208 |

(Continued)

*Primary Examiner* — Nkeisha Smith
(74) *Attorney, Agent, or Firm* — Norton Rose Fulbright US LLP

(57) ABSTRACT

The present disclosure relates to methods, devices, apparatuses, kits, and systems for supporting an object at an opening of a structure, such as a window of a building. In an aspect of the present disclosure, an apparatus includes one or more members that define an interior section and an exterior section. The interior section configured to be coupled to the structure via a first surface of a structure, and the exterior section configured to be coupled to the structure via a second surface of the structure. The apparatus further includes a brace coupled to the one or more members and that extends through a member of the one or more members. The brace comprises includes a first end configured to be coupled to the first surface or the second surface of the structure, and a second end operable to adjust an amount that the brace extends through the member.

18 Claims, 12 Drawing Sheets

(56) References Cited

U.S. PATENT DOCUMENTS

| | | | | |
|---|---|---|---|---|
| 3,394,910 A | * | 7/1968 | Ulich | F24F 13/00 248/208 |
| 8,167,260 B2 | * | 5/2012 | Boccia | F24F 13/32 248/236 |
| 2010/0270448 A1 | * | 10/2010 | Boccia | F24F 13/32 248/208 |

* cited by examiner

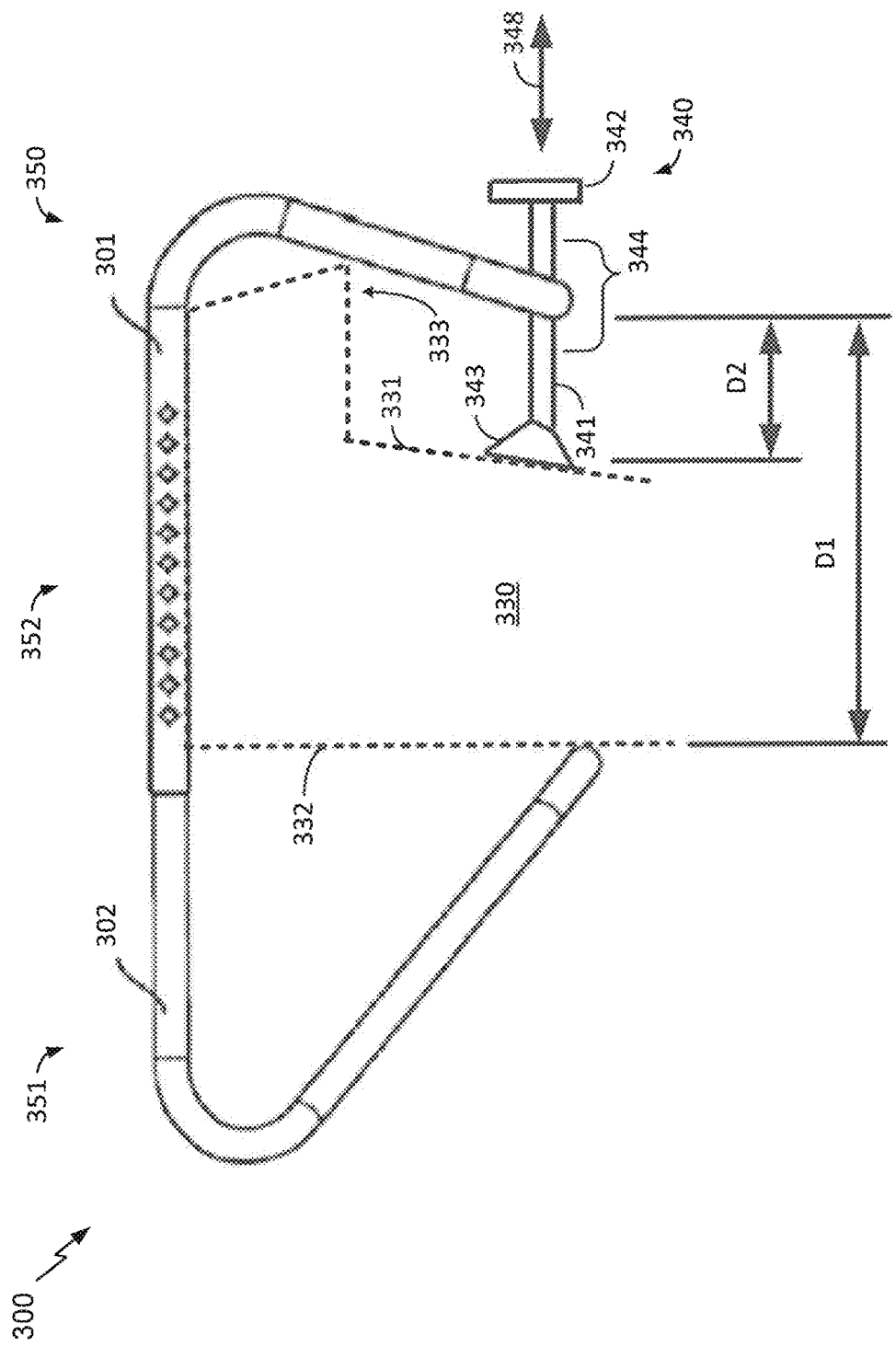

SUPPORT STRUCTURE TO SUPPORT AN OBJECT AT AN OPENING OF A BUILDING

CROSS-REFERENCE TO RELATED APPLICATIONS

The present application claims benefit of U.S. Provisional Application No. 62/733,359 filed Sep. 19, 2018, entitled "SUPPORT STRUCTURE," which is incorporated by reference herein in its entirety.

TECHNICAL FIELD

The present disclosure generally relates to a support structure, and, but not by way of limitation, to methods, devices, kits, and systems for supporting an object at an opening of a structure, such as an object at the window of the building.

BACKGROUND

Objects such as air conditioning units, plants, animal food and housing, decorative arrangements, and the like, are often secured adjacent to or partially within building windows, where a portion of those objects are located outside of the building. Since a portion of the object is located beyond the exterior of a building, there exists a potential for an object to fall from the window to the surface below. Of course, this is particularly problematic in urban areas, where several of such objects may be found in a single building, several stories above the ground surface.

As a result, strict safety regulations have been developed in some urban areas with regard to the installation and maintenance of, e.g., window air conditioning units. For example, the New York City Building Code sets forth specific guidelines that must be adhered to when such a unit is installed. Further, to date, air conditioners and other objects have been attached to a building utilizing support structures that are built into the building itself. As such, if the support system falters or is removed, the building is permanently altered or damaged.

Conventional support systems have been developed (to provide support for objects that are at least partially within a building window) that do not cause damage or require permanent alterations to a building. One or more of these conventional support systems are designed to be adjustable to fit a variety of windows and building (e.g., wall) thicknesses). However, as compared to support systems that are incorporated (e.g., built) into a building, conventional support structures can often be less secure and/or can become less secure over time. For example, conventional support structures may not be able to exactly conform to specific dimensions of a building and/or window at an installation location of the support structure. When the conventional support structures is unable to match the exactly width of a wall or building, the support structure may be loose (e.g., may have "give" or "play"). The inability to conform to specific dimensions of a building and/or wall can also exist present with conventional support systems that are adjustable. For example, such adjustable systems are typically adjustable in increments (e.g., ⅛ inch increments) which result in the support structure being loose. Difficulty in adequately securing conventional support structures is also compounded by the fact that walls are often not flat, do not have uniform thickness, or both. Loose support structures can result in unwanted noise (e.g., rattling), cause damage to a building or wall, and/or become more loose over time from vibrations (e.g., produced by an object supported by the structure). To address a loose support structure (e.g., "play"), a user often creates a quick fix, such as a shim or wedge of wood, cardboard, paper, etc. to fill a gap between a building and the support structure. Such shims or wedges are not are not secured to the wall or support structure and can become dislodged, thereby resulting in a potentially hazardous situation where the support structure is loose. Thus, a need exists for an object support apparatus that provides sufficient safety, is adequately secured to a structure and/or building, and does not damage or otherwise modify the building to which is secured.

SUMMARY

The present disclosure is generally related to systems, devices, apparatuses, kits, and methods for supporting an object (e.g., an air conditioning unit, a plants, animal food and a housing, a decorative arrangement, and the like) at an opening of a structure, such as a window of a building. In an aspect of the present disclosure, an apparatus includes one or more members that define an interior section and an exterior section. The interior section is configured to be coupled to the structure via a first surface (e.g., an interior surface) of the structure, and the exterior section is configured to be coupled to the structure via a second surface (e.g., an exterior surface) of the structure. The one or more members may also define an intermediate section coupled to the interior section and to the exterior section, the intermediate section configured to extend from an interior of the structure to an exterior of the structure via the opening of the structure. The apparatus further includes a brace (e.g., one or more braces) coupled to the one or more members. The brace extends a member of the one or more members, such as an through an aperture of the member. The brace includes a first end configured to be coupled to the first surface or the second surface of the structure, and a second end operable to adjust an amount that the brace extends through the member. For example, the brace may include a shaft including a threaded portion, a foot (associated with the first end of the bract) coupled to the shaft and configured to contact the first surface or the second surface, and an adjustment mechanism (associated with the second end of the brace) coupled to the shaft and configured to enable rotation of the shaft. The brace may be configured to adjust a distance between the first surface and the interior section, or to adjust a distance between the second surface and the exterior section. In some implementations, the apparatus may further include one or more support members coupled between a first portion of the intermediate section and a second portion of the intermediate section. The one or more support members may be configured to support the object.

When the apparatus is installed at the window of the building, the two or more members are configured to support the object based on a first force exerted on the interior surface via the interior section, and a second force exerted on the exterior surface via the exterior section. For example, in implementations where the brace extends through the interior section, at least a portion of the first force is exerted on the first surface by the brace. Alternatively, where the brace extends through the exterior section, at least a portion of the second force is exerted on the second surface by the brace.

Thus, the present disclosure describes an apparatus (e.g., a support structure) that includes one or more braces which may be adjusted to secure the apparatus with respect to a structure (e.g., a window of a wall/building). The apparatus may beneficially be securable in such a manner that the apparatus does not damage or otherwise modify the building to which is secured. Additionally, the apparatus may comply with one or more municipal ordinances and other applicable safety requirements. Additionally, or alternatively, the one or more braces may provide refined fitting adjustments that would otherwise be unavailable. For example, when the apparatus is adjustable in one or more increments, the one or more braces may advantageously provide additional adjustment/refinement greater than or equal to a value of a single increment (e.g., ⅛ inch). When the apparatus includes multiple braces, each brace may beneficially be adjustable independent of the other braces to account for an uneven surface between braces coupled to the same surface and to secure attachment of the apparatus at each brace. In some implementations, a foot of a brace configured to contact a surface may be rotatable with respect to a shaft of the brace such that the foot of the has an improved contact area with the surface, and without damaging the surface, as compared to a foot that does not rotate with respect to the shaft.

The systems and apparatuses described in the present disclosure may also include one or more support members to reinforce and increase a stability of the support structure. Additionally, or alternatively, components of systems and apparatuses described here may advantageously comprise one or a combination of lightweight materials that impart sufficient strength such as, for example, steel, aluminum, or fiber-reinforced plastic, and the like. Accordingly, the entire weight of the object may be supported by systems and apparatuses without modification and/or damage to the structure to which the systems and apparatuses are adjoined. Furthermore, in some implementations, the apparatus may have a module design to enable compact packaging and/or an easily assembled and installed support structure.

In an aspect of the present disclosure, an apparatus (that, when installed at a window of a building, is configured to support an object at the window of the building) includes two or more members. The two or more members include a first member and a second member that, when coupled together, define: an interior section, an exterior section, and an intermediate section. The interior section is configured to be coupled to an interior surface of the building. The exterior section is configured to be coupled to an exterior surface of building. The intermediate section is coupled to the interior section and to the exterior section, the intermediate section configured to extend from an interior of the building to an exterior of the building via the window. The apparatus further includes a brace configured to extend through the first member. The brace includes a first end configured to be coupled to the interior surface or the exterior surface of the building, and a second end operable to adjust an amount that the brace extends through the first member. When the apparatus is installed at the window of the building, the two or more members are configured to support the object based on: a first force exerted on the interior surface via the interior section, and a second force exerted on the exterior surface via the exterior section. In some such implementations, the brace extends through the interior section and is configured to adjust a distance between the interior surface and the interior section, and where at least a portion of the first force is exerted on the interior surface by the brace.

In an implementation of the apparatus, the brace includes a shaft comprising a threaded portion, the shaft having a first and a second end; an adjustment mechanism coupled to the first end and configured to enable rotation of the shaft, and a foot coupled to the second end and configured to contact the interior surface or the exterior surface. In some such implementations, the first member comprises a first continuous member having a first end and a second end, the first continuous member comprises an entirety of the interior section, and the second member comprises a second continuous member having a third end and a fourth end, the second continuous member comprises an entirety of the exterior section. The first continuous member and the second continuous member may be coupled at a first location of the intermediate section via the first end of the first continuous member and the third end of the second continuous member. Additionally, or alternatively, the first continuous member and the second continuous member may be coupled at a second location of the intermediate section via the second end of the first continuous member and the fourth end of the second continuous member. In a particular implementation of the apparatus, the apparatus further includes a second brace configured to extend through the first member, which includes an first aperture through which the brace extends, and a second aperture through which the second brace extends. Additionally, or alternatively, the apparatus may also include one or more support members coupled between a first portion of the intermediate section and a second portion of the intermediate section, the one or more support members configured to support the object.

In an implementation of the apparatus, the apparatus includes a length adjustment mechanism coupled to the first member and to the second member. In some implementations, the length adjustment mechanism comprises a telescoping clamp (e.g., a telescoping tube clamp). The length adjustment mechanism may include a first end and a second end, and the length adjustment mechanism may be configured to be coupled to the first member via the first end and is coupled to the second member via the second end. Additionally, or alternatively, the length adjustment mechanism comprises a lever may be configurable in a first position and in a second position. In some such implementations, when the lever is configured in the first position, a position of the first member relative to the second member is adjustable; and/or when the lever is configured in the second position, a position of the first member relative to the second member is secured.

In another aspect of the present disclosure, an apparatus includes one or more members configured to support an object at an opening of a structure, the one or more members define: an first section configured to be coupled to the structure via a first surface of the structure; and a second section configured to be coupled to the structure via a second surface of the structure. The apparatus further includes a brace coupled to the one or more members and that extends through a member of the one or more members. The brace includes: a first end configured to be coupled to the first surface or the second surface of the structure; and a second end operable to adjust an amount that the brace extends through the member. In some such implementations, the brace may include: a shaft comprising a threaded portion, the shaft having a first and a second end; an adjustment mechanism coupled to the first end of the shaft and configured to enable rotation of the shaft; and a foot coupled to the second end of the shaft and configured to contact the first surface or the second surface. In some implementations, the member comprises an aperture; and the brace extends through the aperture. Additionally, or alternatively, in other implementations, the one or more members further define an intermediate section coupled to the first section and to the second section, the intermediate section configured to extend from an interior of the structure to an exterior of the structure via the opening of the structure. In some such implementations, the apparatus further includes one or more support members coupled between a first portion of the intermediate section and a second portion of the intermediate section, the one or more support members configured to support the object.

In some implementations of the apparatus, when the apparatus is installed at the opening of the structure the one or more members are configured to support the object based on: a first force exerted on the first surface via the first section, and a second force exerted on the second surface via the second section. In some such implementations, the opening comprises a window; the structure comprises a building; the first surface comprises an interior surface of the building; and the second surface comprises an exterior surface of the building. In implementations where the brace extends through the first section, the brace is configured to adjust a distance between the first surface and the first section, and at least a portion of the first force is exerted on the first surface by the brace. In implementations where the brace extends through the second section, the brace is configured to adjust a distance between the second surface and the second section, and at least a portion of the second force is exerted on the second surface by the brace.

In some implementations of the apparatus, the apparatus further includes a second brace coupled to the one or more members and that extends through the member or a second member of the one or more members. Additionally, or alternatively, the one or more members include: a first continuous member having a first end and a second end; and a second continuous member having a third end and a fourth end. The first continuous member and the second continuous member may be coupled at a first location via the first end of the first continuous member and the third end of the second continuous member, and/or may be coupled at a second location via the second end of the first continuous member and the fourth end of the second continuous member.

In some implementations of the apparatus, the one or more members include: a first adjustable member comprising a first sub-member and a second sub-member; and a second adjustable member comprising a third sub-member and a fourth sub-member. The first sub-member and the third sub-member may be configured to be coupled at a first location associated with the intermediate section, and the second sub-member and the fourth sub-member may be configured to be coupled at a second location associated with the intermediate section. Additionally, or alternatively, the first sub-member and the second sub-member may be coupled at a third location associated with the first section; and the third sub-member and the fourth sub-member may be coupled at a fourth location associated with the second section. In some implementations, the apparatus may include a second brace coupled to the one or more members, and the third location is positioned between the brace and the second brace. Alternatively, the apparatus may include a second brace coupled to the one or more members, and the fourth location is positioned between the brace and the second brace. In a particular implementation, the apparatus includes one or more adjustable support members coupled between a first portion of the intermediate section and a second portion of the intermediate section, each of the one or more adjustable support members including a first portion and a second portion coupled to the first portion.

In another aspect of the present disclosure, a kit for an apparatus is disclosed, such that the apparatus, when installed at a window of a building, is configured to support an object at the window of the building. The kit includes: two or more members that, when coupled together, define: an interior section configured to be coupled to an interior surface of the building; an exterior section configured to be coupled to an exterior surface of building; and an intermediate section coupled to the interior section and to the exterior section, the intermediate section configured to extend from an interior of the building to an exterior of the building via the window. The kit further includes a brace configured to extend through a member of the one or more members. The brace includes: a first end configured to be coupled to the interior surface or the exterior surface of the building; and a second end operable to adjust an amount that the brace extends through the member. In some implementations of the kit, the kit further includes a package that includes the one or more members and the brace. Additionally, or alternatively, in some implementations, the one or more members comprise at least a first member and a second member, and the first member and the second member are configured to be reversibly coupled to each other.

In another aspect of the present disclosure, a method includes: positioning, at a window of a building, an apparatus comprising one or more members and at least one brace that extends through a member of the one or more members; coupling an interior section of the apparatus to an interior surface of the building; coupling an exterior section of the apparatus to an exterior surface of the building; and adjusting a position of the at least one brace with respect to the member to adjust a first distance between the interior section and the interior surface or a second distance between the exterior section and the exterior surface. In some such implementations, adjusting the position of the at least one brace includes: contacting a first end of the brace to the interior surface or the exterior surface; and/or rotating a second end of the brace. Additionally, or alternatively, positioning the apparatus at the window of the building may include positioning an intermediate section of the apparatus on a sill of the window.

In another aspect of the present disclosure, one or more implementations may be modular and include components that are of adjustable dimensions and configurations, being able to accommodate standard (albeit different) building dimensions and materials, window dimensions, and objects of various dimensions. This modularity also provides for easy packaging, assembly, and repair or flexible arrangement and use.

Particular implementations of the present disclosure are described below with reference to the drawings. In the description, common features are designated by common reference numbers throughout the drawings. As used herein, various terminology is for the purpose of describing particular implementations only and is not intended to be limiting of implementations. For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where."

As used herein, an ordinal term (e.g., "first," "second," "third," etc) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of a described implementation. In the methods described herein, the acts can be carried out in any order, except when a temporal or operational sequence is explicitly recited. Furthermore, certain acts can be carried out concurrently even if described as being carried out sequentially. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

The foregoing has outlined rather broadly the features and technical advantages of the present disclosure in order that the detailed description that follows may be better understood. Additional features and advantages will be described hereinafter which form the subject of the claims. It should be appreciated by those skilled in the art that the conception and specific examples disclosed may be readily utilized as a basis for modifying or designing other structures for carrying out the same purposes described herein. It should also be realized by those skilled in the art that such equivalent constructions do not depart from the spirit and scope of the disclosure as set forth in the appended claims. The aspects which are characterized herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIGS. 3F and 3F-1 are other views of the example of the apparatus of FIG. 3;

FIGS. 3I and 3I-1 are other views of the example of the apparatus of FIG. 3;

FIG. 3K is another view of the example of the apparatus of FIG. 3;

DETAILED DESCRIPTION OF THE INVENTION

Figure 1:
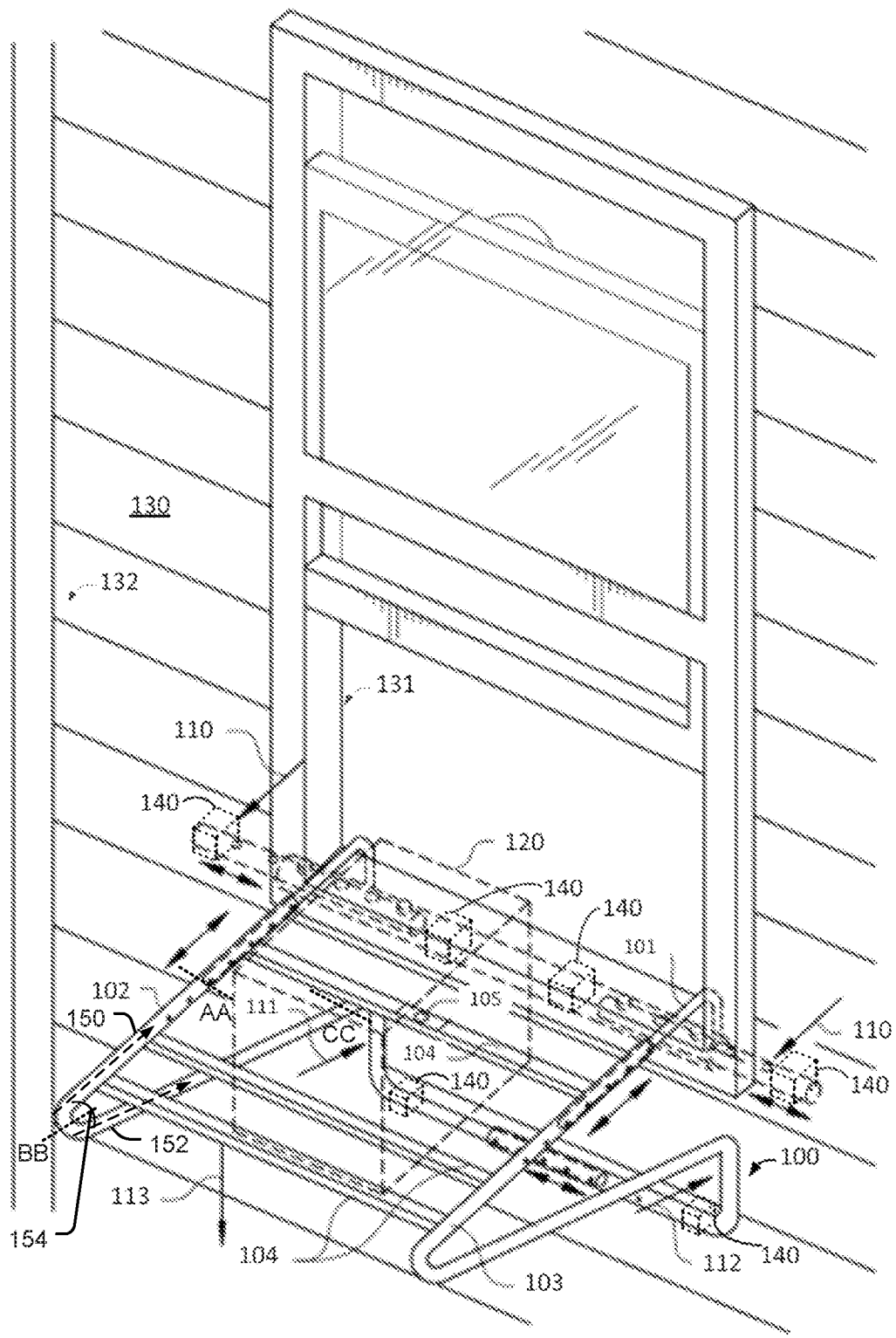
FIG. 1 illustrates an example of an apparatus for supporting an object at an opening of a structure.

Referring to FIG. 1, an example of an apparatus 100 for supporting an object at an opening of a structure is shown. In some implementations, as described herein, the opening of the structure may include a window of a building 130. The apparatus 100 is configured to be removably installed at the opening, such that the apparatus 100 may be installed and/or removed without damage or modification to the apparatus 100 and/or the structure (e.g., 130) to which the apparatus 100 is secured.

Apparatus 100 includes one or more members, such as first member 101, second member 102, and third member 103. First member 101 is engaged with second member 102 and third member 103 at sections of first member 101 that extend from an interior (e.g., 131) of building 130 to an exterior 132 of building 130 at each of its respective distal ends. First member 101 is configured to apply an outward force to an interior surface (associated with interior 131) of building 130 in response to a downward force exerted by object 120 being supported by apparatus 100. The outward force exerted by first member 101 is illustrated by vector 110.

Second member 102 and third member 103 are each coupled to first member 101 and are configured to apply an inward force to the exterior surface (associated with exterior 132) of the building 130 in response to the downward force exerted by object 120. The inward force exerted by second member 102 is illustrated by vector 111 and the inward outward force exerted by third member 103 is illustrated by vector 112. As described further herein, first member 101, second member 102, and third member 103 operate to secure object 120 to building 130 and may secure without damage and/or modification to building 130. Additionally, or alternatively, first member 101, second member 102, and third member 103 operate to secure object 120 to building 130 while complying with applicable municipal ordinances and other safety requirements.

First member 101 is configured to extend at least along a partial width of an opening (e.g., an aperture) of building 130. First member 101 is configured to be coupled to, either directly or via another component, an interior surface of the building on either side (e.g., a right side and a left side) of the window. In a particular implementation, first member 101 abuts the interior surface of the building 130. In some implementations, first member 101 may extend along the entire length of the window or beyond the width. First member 101 may reversibly engage second member 102 and third member 103 by various attachment mechanisms. By way of example, first member 101 may comprise one or more notches that are configured to accept corresponding protrusions from second member 102 and third member 103 (e.g., by virtue of a male and female arrangement). In any event, first member 101 and second member 102 may form an engaged position second member 102 and third member 103 such that each is locked with respect to one another and may later be maneuvered by a user to an disengaged position, so that each may be moved or separated from one another. The reversible engagement between first member 101 with second member 102 and third member 103 (whether by a fastener, removable pins, or aligned notches and/or grooves) is advantageous because it enables the dimension of apparatus 100 to be adjusted in terms of length, width, and height to accommodate objects 120 of different sizes and/or each may be folded with respect to one another for packaging, transport, and the like. With each member able to be packaged while being separated from every other member, packaging and transport costs are greatly reduced. For example, the members may be included in a kit, as described further herein at least with reference to FIG. 5.

Optionally, a sealing member configured to seal the interior of building 130 from the exterior of building 130 may be formed around the sections of first member 101 extending from the interior of building 130 to the exterior of building 130 (or second member 102 and third member 103) and the surface of a window at second member 102.

First member 101 may be variable along the width of the window so that apparatus 100 may be utilized with windows of different widths. The adjustments should be sufficient to permit a width of first member 101 to be adjusted to exert sufficient outward force to the interior surface of building 130. In some implementations, the width of first member 101 is adjusted so that first member 101 is sufficiently wider than a width of the window opening. In some implementations, first member 101 includes a central portion and two telescoping distal portions, each of which may be actuated between a retracted and extended position to ensure a desired length. According to other implementations, first member 101 may include two pieces, where one slides along the length of another to form a desired length. In either case, the length may be fixed by a reversible fastener means, one or more securing pins or bolts, or a latch mechanism. In some implementations, a soft material, such as rubber or a rubber composite, may cover first member 101 to prevent and/or prohibit (e.g., reduce) damage to the interior surface and/or window surrounding.

Second member 102 and third member 103 extend from respective intermediate sections of first member 101 and support object 120 along their top surface. The length of second member 102 and third member 103 may be adjusted to accommodate different objects 120 and building walls of different thickness. In some implementations, second member 102 and third member 103 may include an outer sleeve that slides along the length of the intermediate sections of first member 101 extending from the interior of building 130. In such implementations, the intermediate sections of member 101 may be considered as inner sleeves, where the length of apparatus 100 is adjusted by sliding the intermediate sections of first member 101 along the length of the second member 102 and third member 103. Length adjustments may be performed by aligning appropriate apertures in the inner sleeve and outer sleeve and inserting a securing pin or fastener through the aligned apertures. Length adjustments may also be performed by sliding the sleeves or segments along a series notches or grooves so that it each is seated in a desired notch or groove at the desired length.

Further, it should be appreciated that second member 102 and third member 103 (illustrated as a single component at FIG. 1) may, in fact, be configured with or comprise other structures that may be configured according to specific dimensions of object 120. For example, second member 102 and third member 103 may configured with one or more support members 104, such as one or more rods, beams, and/or planar surfaces, extending there between. The spacing between the multiple rods or beams (e.g., 104) may be configured by a user to support the edges of object 120. In some implementations, the one or more support structures are adjustable to fit a spacing between second member 102 and third member 103. Such a configuration is thought to be advantageous in that it will inhibit object 120 from becoming lopsided due to high winds, unbalanced weight, and the like. Additionally, or alternatively, the one or more support structures may provide rigidness and/or support to apparatus 100, such as stability between one or more of members 101, 102, 103.

The lower portions of second member 102 and third member 103 extend to building 130 at an angle from their top portions, i.e., where object 120 exerts a downward force illustrated by the vector 113. A second portion 152 (e.g., a bottom portion between dotted lines BB and CC) of second member 102 extends toward building 130 at an angle 154 from a first portion 150 (e.g., a top portion between dotted lines AA and BB) of second member 102. First portion 150 of second member 102 extends toward interior 131 of building 130. Accordingly, second member 102 and third member 103 structurally operate to resist the downward force exerted by object 120 that would otherwise cause object 120 to fall to the surface or rotate inward toward building 130. As such, second member 102 and third member 103 provide a supportive force, where the supportive force has at least a component perpendicular to the exterior surface of building 130, keeping object 120 separate from building 130. Further, first member 101 provides an equal, opposing supporting force perpendicular to the interior surface of building 130. In this way, first member 101, second member 102, and third member 103 restrain motion of object 120 with respect to building 130.

In one implementation, second member 102 and third member 103 extend along the width of first member 101 along their lower distal ends which are reversibly coupled to one another. Second member 102 and third member 103 may be coupled along a location aligned with the medial portion of first member 101. Similar to the previous discussion, each may be adjusted by sliding along their respective length, etc. In this way, the width of apparatus 100 may be varied.

The length of second member 102 and third member 103 and the angles at which each extend toward building 130 may vary according to different considerations. For example, 1) the orthogonal or near orthogonal distance from the surface of building 130 at which second member 102 and third member 103 meets first member 101, and/or 2) the distance below first member 101 at which second member 102 and third member 103 are configured to couple to the surface of building 130 may be varied. This may be done to accommodate objects of different lengths, city ordinances, safety regulations, and the like. In some implementations, the distance from the surface of building 130 at which second member 102 and third member 103 couple with first member 101 may be varied by sliding the end of each along a series notches or grooves so that they may be seated in a desired notch or groove. In some implementations, notches of a series of notches may, be space apart at a predetermined interval. Additionally, or alternatively, according to other implementations, second member 102 and third member 103 can be adjusted along the length of intermediate sections of member 101 by nut and bolt combinations, screws, or a reversible fastening mechanism, such as adjustable clamping or biasing means. For example, according to a particular implementation, second member 102 and third member 103 may be attached to a respective intermediate section of first member 101 by a bolt or pin inserted through a pair of aligned apertures in each (defined through either the horizontal or vertical surfaces of each).

The lower distal ends of second member 102 and third member 103 are configured to be coupled to, either directly or via another component, the exterior surface of building 130. For example, in an implementation where the lower distal ends of second member 102 and third member 103 abut building 130, the lower distal ends of second member 102 and third member 103 may be adjustable so that they remain flush against the surface of building 130 even where the angle of second member 102 and third member 103 change with respect to the surface of building 130. In one embodiment, each comprises an adhesive material that provides sufficient resistance to alter movement. According to another embodiment, the lower end of each may be in combination with or comprise a foot such as a resilient, vibration isolation pad secured thereto, which effectively serves as a "non-skid" pad.

Apparatus 100 includes one or more braces 140, as represented by dashed boxes. The one or more braces 140 are adjustable and may be operated to securely and removably (e.g., releasably) couple the apparatus 100 to the structure (e.g., 130). For example, the one or more braces 140 may beneficially secure the apparatus 100 in such a manner that the apparatus 100 does not damage or otherwise modify the building 130 to which the apparatus 100 is secured. The one or more braces 140 may be adjustable over a range (e.g., a distance) to enable the apparatus 100 to be customized to one or more openings (e.g., windows) and/or structures (e.g., buildings 130). When the apparatus 100 includes multiple braces, each brace may be adjustable independent of the other braces to account for an uneven surface between braces coupled to the same surface and/or to secure/stabilize attachment of the apparatus 100 at each brace. It is noted that the location of the one or more braces 140 shown in FIG. 1 are for illustration purposes only, and that the one or more braces 140 may be positioned at other locations on the apparatus 100. Additionally one or more braces as represented may be removed or one or more additional brace may be added. A brace (e.g., 140) is described further herein at least with reference to FIG. 3.

The one or more braces 140 may be coupled to a member, such as first member 101, second member 102, and/or third member 103. In some implementations, a brace (e.g., 140) extends through a member (e.g., 101, 102, 103). For example, the brace may extend through an aperture (not shown) of a member. In some implementations, the member includes a first aperture on a first side of the member and a second aperture on a second side of the member. The first aperture may be coupled to the second aperture via a conduit, such as a threaded conduit configured to receive the brace. In a particular implementation, the conduit may be included in a fitting that is coupled to the member (e.g., inserted in the member through the first and second apertures, and secured to the member).

Brace 140 includes a first end configured to be coupled to the interior surface or the exterior surface of the building 130, and a second end operable to adjust an amount that the brace extends through a corresponding member. To illustrate, when brace 140 is coupled to first member, the first end of brace 140 is configured to be coupled to (e.g., contact) the interior surface of the building 130. In such implementations, at least a portion of a force (exerted on the interior surface of the building 130 by the apparatus 100) is exerted via the brace 140 coupled to the first member 101. When brace 140 is coupled to second member 102 or third member 103, brace 140 is configured to be coupled to (e.g., contact) the exterior surface of the building 130. In such implementations, at least a portion of a force (exerted on the exterior surface of the building 130 by the apparatus 100) is exerted via the brace 140 coupled to the second member 102 or the third member 103.

The brace 140 may include a shaft that extends through the aperture of a member. The shaft includes a first end and a second end. In some implementations, at least a portion of the shaft is threaded and is configured to engage the aperture and/or a threaded fitting coupled to the aperture. The brace 140 may also include an adjustment mechanism coupled to the first end and configured to adjust a position of the brace 140 with respect to the aperture (e.g., with respect to the member through which the brace extends). For example, when the shaft includes a threaded portion, the adjustment mechanism may be configured to enable rotation of the shaft. The second end of the shaft may be configured to be coupled to (or contact) the interior surface or the exterior surface of the building 130. In some implementations, the brace 140 includes a foot coupled to the second end and configured to be coupled to (e.g., contact) the interior surface or the exterior surface of the building 130. In some implementations, the foot may be rotatably coupled to the second end of the shaft to enable a surface of the foot (that contacts a surface) to adjust to the surface, which may not be exactly flat, may be not be exactly vertical, and/dr may not be exactly perpendicular to a longitudinal axis of the shaft. In such implementations, a contact surface of the foot may include a resilient, vibration isolation pad secured thereto, which effectively serves as a "non-skid" pad. Additionally, or alternatively, the foot may be out of a resilient material (e.g., rubber or rubber composite) and/or the contact surface may be textured, ridged, grooved, and/or the like.

Apparatus 100 may further comprise level indicator 105, which includes a bubble floating in a liquid contained in an elongated, clear tube. The level indicator may also include a first line disposed across the tube toward the distal end thereof and a second line disposed across the tube toward the proximal end thereof. After placing object 120 in an initial position, reference may be made to level indicator 105. The angle of second member 102 and third member 103 may be adjusted as described above, until the floating bubble indicates that object 120 is at a desired angle with respect to building 130.

As shown in FIG. 1, object 120 may be supported along building 130 by virtue of the physical arrangement between the one or more members, e.g., first member 101, second member 102, and third member 103, because the physical arrangement sufficient forces against both the interior and exterior surfaces of building 130 in response to the downward force exerted by object 120. As such, no further mechanical support is needed. Instead, by virtue of this arrangement, the surfaces of building 130 are leveraged to secure object 120 thereto. That is, as shown in FIG. 1, the downward force exerted by object 120 on apparatus 100 operates to bias the first member 101 toward the interior wall of building 130. In doing so, the bias is of sufficient magnitude to hold first member 101 at a fixed position at the interior surface of building 130. Simultaneously, the downward force exerted by object 120 on apparatus 100 operates to bias the second member 102 and third member 103 toward exterior surface of building 130. The bias is of sufficient magnitude to hold the lower distal ends of second member 102 and third member 103 at a fixed position at the exterior surface of building 130.

In some implementations of apparatus 100, one or more components (e.g., the one or more members (e.g., 101, 102, 103), the one or more braces 140, or a combination thereof) of the apparatus 100 may include one or a combination of lightweight materials that impart sufficient strength such as, for example, steel, aluminum, or fiber-reinforced plastic, and the like. Accordingly, the entire weight of the object 120 may be supported the apparatus 100 without modification and/or damage to the structure (e.g., 130) to which the apparatus 100 is adjoined. Additionally, or alternatively, in some implementations, the apparatus 100 may have a module design to enable compact packaging and/or an easily assembled and installed support structure. Additionally, it is noted that although the apparatus 100 has been described with the apparatus being installed in the opening in a first orientation (e.g., with respect to interior 131 and exterior 132), these references are not intended to be limiting. For example, it is understood that that an interior surface can include a first surface of a structure (e.g., a wall) without limitation to an interior or an exterior, and that an exterior surface and include a second surface of the structure (e.g., the wall) without limitation to an interior or an exterior. For example, both the first surface and the second surface can be interior surfaces. As another example, the first surface can be an exterior surface while the second surface can include an interior surface, such that the apparatus is installed in a reverse orientation as shown in FIG. 1.

In a particular implementation of the apparatus 100, the apparatus (that, when installed at a window of the building 130, is configured to support object 120 at the window of the building 130) and includes two or more members (e.g., 101, 102, 103). The two or more members include a first member and a second member that, when coupled together, define an interior section (associated with 131), an exterior section (associate with 132), and an intermediate section. The interior section is configured to be coupled to an interior surface of the building 130. The exterior section is configured to be coupled to an exterior surface of building 130. The intermediate section is coupled to the interior section and to the exterior section, the intermediate section configured to extend from an interior of the building to an exterior of the building 130 via the window. The apparatus 100 further includes a brace 140 configured to extend through the first member. The brace 140 includes a first end configured to be coupled to the interior surface or the exterior surface of the building 130, and a second end operable to adjust an amount that the brace 140 extends through the first member. When the apparatus is installed at the window of the building 130, the two or more members are configured to support the object 120 based at least on: a first force exerted on the interior surface via the interior section, and a second force exerted on the exterior surface via the exterior section.

In another particular implementation of the apparatus 100, the apparatus 100 includes one or more members (e.g., 101, 102, 103) configured to support Object 120 at an opening of a structure (e.g., 130), the one or more members define: an interior section configured to be coupled to the structure via a first surface of the structure, and an exterior section configured to be coupled to the structure via a second surface of the structure. The apparatus 100 further includes brace 140 coupled to the one or more members and that extends through a member of the one or more members. The brace 140 includes: a first end configured to be coupled to the first surface or the second surface of the structure, and a second end operable to adjust an amount that the brace 140 extends through the member.

Thus, FIG. 1 describes apparatus 100 (e.g., a support structure) that includes one or more braces 140 which may be adjusted to secure apparatus 100 with respect to a structure (e.g., a window of a wall/building 130). Additionally, or alternatively, the one or more braces (e.g., 104) may provide refined fitting adjustments that would otherwise be unavailable in conventional support structures. For example, when the apparatus 100 is adjustable in one or more increments, the one or more braces 140 may advantageously provide additional adjustment/refinement across a range that is greater than or equal to a value of a single increment (e.g., ⅛ inch as an illustrative, non-limiting example). Apparatus 100 may also include one or more support members 104 to reinforce and increase a stability of the apparatus 100. The apparatus 100 may beneficially be securable in such a manner that the apparatus 100 does not damage or otherwise modify the building 130 to which is secured. Additionally, the apparatus 100 may comply with one or more municipal ordinances and other applicable safety requirements.

Figure 2:
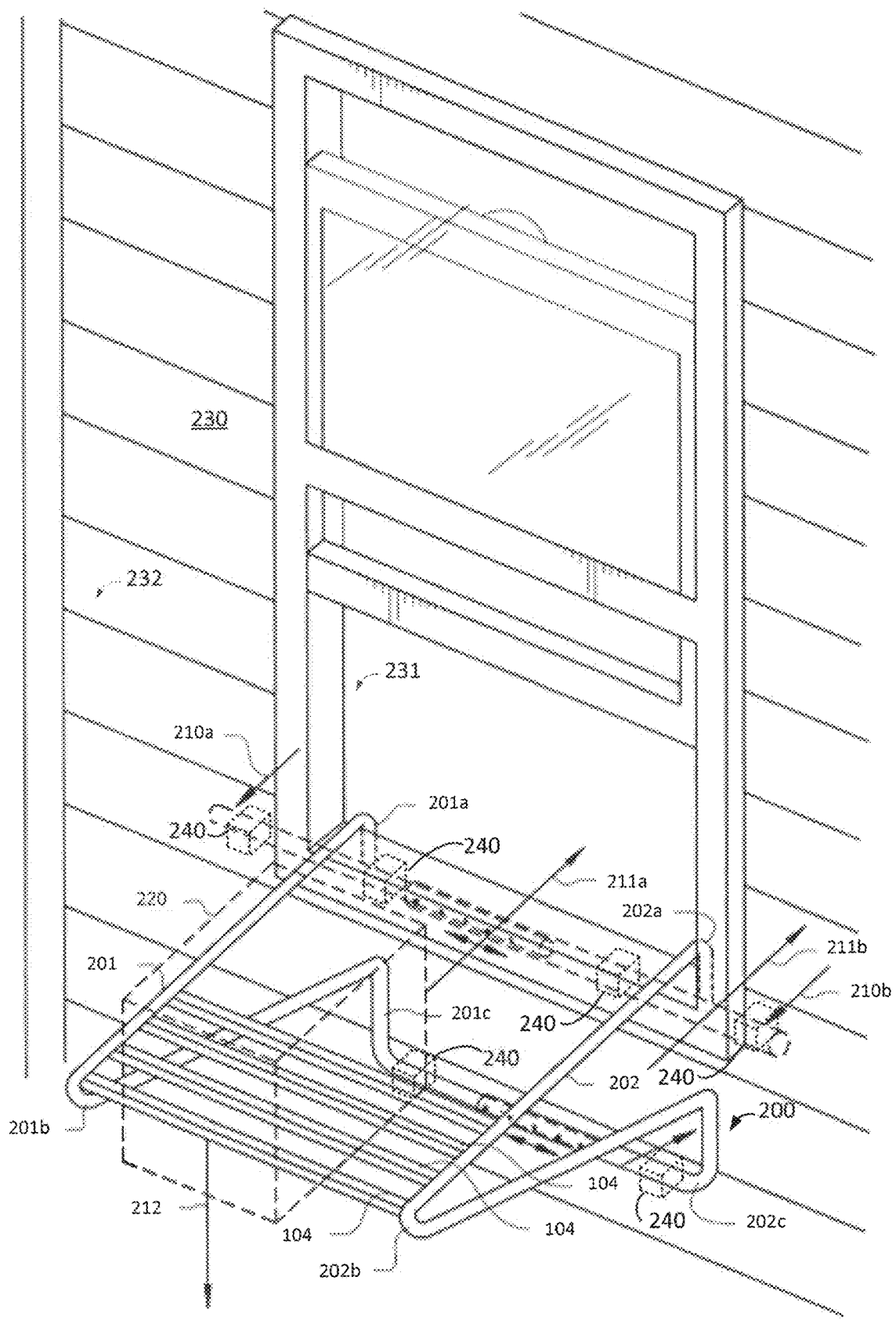
FIG. 2 illustrates another example of an apparatus for supporting an object at an opening of a structure.

Referring to FIG. 2, an example of an apparatus 200 for supporting an object 220 at an opening of a structure is shown. Object 220 may include or correspond to object 120 of FIG. 1. In some implementations, as described herein, the opening of the structure may include a window of a building 230. Building 230 may include or correspond to building 130. Building 230 includes an interior 231 (associated with an interior surface) and an exterior 232 (associated with an exterior surface). The apparatus 200 is configured to be removably installed at the opening, such that the apparatus 200 may be installed and/or removed without damage or modification to the apparatus 200 and/or the structure (e.g., 230) to which the apparatus 200 is secured.

Apparatus 200 includes one or more members, such as first member 201 and second member 202. First member 201 comprises sections 201a, 201b, and 201c (e.g., first sub-sections) and second member 202 comprises sections 202a, 202b, and 202c (e.g., second sub-sections).

Interior section 201a extends along at least a partial width of the window and is coupled to (e.g., directly or indirectly) an interior surface of building 230. Interior section 201a supports object 120 by exerting an outward force on the interior surface of building 130 in response to a downward force exerted by object 220 on apparatus 200. The outward force exerted by interior section 201a is illustrated by vector 210a. Intermediate section 201b extends from interior section 201a at the interior of building 130 to the exterior of building 230. Intermediate section 201b extends from interior section 201a at a distal end of interior section of 201a. Exterior section 201c extends from intermediate section 201b and is configured to support object 220 by exerting an inward force on an exterior surface of building 130 in response to the downward force exerted by object 220. The inward force exerted by exterior section 201c is illustrated by vector 211a.

Interior section 202a extends along at least a partial width of the window and is coupled to (e.g., directly or indirectly) an interior surface of building 130. Interior section 202a supports object 220 by exerting an outward force on the interior surface of building 230 in response to a downward force exerted by object 220 on apparatus 200. The outward force exerted by interior section 202a is illustrated by vector 210b. Intermediate section 202b extends from interior section 202a at the interior of building 130 to the exterior of building 230. Intermediate section 202b extends from interior section 202a at a distal end of interior section of 202a. Exterior section 202c extends from intermediate section 202b and is configured to support object 220 by exerting an inward force on an exterior surface of building 230 in response to the downward force exerted by object 120. The inward force exerted by exterior section 202c is illustrated by vector 211b.

First member 201 and second member 202 may be coupled to one another according to any number of mechanisms as described herein. In some implementations, each are reversibly coupled to one another along their respective interior sections and exterior sections and slide or move with respect to one another to vary the dimensions of apparatus 200.

Apparatus 200 includes one or more braces 240, as represented by dashed boxes. The one or more braces 240 may include or correspond to the one or more braces 140 of FIG. 1 and may be configured to operate as described at least with reference to the one or more braces 140 of FIG. 1. The one or more braces 240 are adjustable and may be operated to securely and removably (e.g., releasably) couple the apparatus 200 to the structure (e.g., 230). For example, the one or more braces 240 may beneficially secure the apparatus 200 in such a manner that the apparatus 200 does not damage or otherwise modify the building 230 to which the apparatus 200 is secured. The one or more braces 240 may be adjustable over a range (e.g., a distance) to enable the apparatus 200 to be customized to one or more openings (e.g., windows) and/or structures (e.g., buildings 230). When the apparatus 200 includes multiple braces, each brace may be adjustable independent of the other braces to account for an uneven surface between braces coupled to the same surface and/or to secure/stabilize attachment of the apparatus 100 at each brace. It is noted that the location of the one or more braces 240 shown in FIG. 2 are for illustration purposes only, and that the one or more braces 240 may be positioned at other locations on the apparatus 200. Additionally one or more braces as represented may be removed or one or more additional brace may be added. A brace (e.g., 240) is described further herein at least with reference to FIG. 3.

The one or more braces 240 may be coupled to a member, such as first member 201 (e.g., 201a, 201c) and second member 202 (e.g., 202a, 202c). In some implementations, a brace (e.g., 240) extends through a member (e.g., 201, 202). For example, the brace may extend through an aperture (not shown) of a member. In some implementations, the member includes a first aperture on a first side of the member and a second aperture on a second side of the member. The first aperture may be coupled to the second aperture via a conduit, such as a threaded conduit configured to receive the brace. In a particular implementation, the conduit may be included in a fitting that is coupled to the member (e.g., inserted in the member through the first and second apertures, and secured to the member).

In some implementations, apparatus 200 may further comprise level indicator (not shown), which includes a bubble floating in a liquid contained in an elongated, clear tube. The level indicator may include or correspond to the level indicator 105 of FIG. 1. The level indicator may also include a first line disposed across the tube toward the distal end thereof and a second line disposed across the tube toward the proximal end thereof. After placing object 220 in an initial position, reference may be made to level indicator the. The level indicator may be included on, or incorporated in, one or more of the first member 201, the second member 202, or one or more of one or more support structures (e.g., 104).

According to the operation of apparatus 200, the sum of the outward forces exerted by the interior sections of members 201 and 202 on the interior surface of building 230 and the inward threes exerted by the exterior sections of members 201 and 202 on the exterior surface of building 230 are sufficient to oppose the downward force of object 220. The downward force exerted by object 220 is illustrated by the vector 212. During such operation, the sum of the outward forces exerted by the interior sections of members 201 and 202 on the interior surface of building 130 and the inward forces exerted by the exterior sections of members 201 and 202 on the exterior surface of building are sufficient to support object 220 at the window.

In some implementations of apparatus 200, one or more components (e.g., the one or more members (e.g., 201, 202), the one or more braces 240, or a combination thereof) of the apparatus 100 may include one or a combination of lightweight materials that impart sufficient strength such as, for example, steel, aluminum, or fiber-reinforced plastic, and the like. Accordingly, the entire weight of the object 220 may be supported the apparatus 200 without modification and/or damage to the structure (e.g., 230) to which the apparatus 200 is adjoined. Additionally, or alternatively, in some implementations, the apparatus 200 may have a module design to enable compact packaging and/or an easily assembled and installed support structure. Additionally, it is noted that although the apparatus 100 has been described with the apparatus being installed in the opening in a first orientation (e.g., with respect to interior 131 and exterior 132), these references are not intended to be limiting. For example, it is understood that that an interior surface can include a first surface of a structure (e.g., a wall) without limitation to an interior or an exterior, and that an exterior surface and include a second surface of the structure (e.g., the wall) without limitation to an interior or an exterior. For example, both the first surface and the second surface can be interior surfaces. As another example, the first surface can be an exterior surface while the second surface can include an interior surface, such that the apparatus is installed in a reverse orientation as shown in FIG. 1.

In a particular implementation of the apparatus 200, the apparatus (that, when installed at a window of the building 230, is configured to support object 220 at the window of the building 230) and includes two or more members (e.g., 201, 202). The two or more members include a first member and a second member that, when coupled together, define an interior section (e.g., 201a, 202a), an exterior section (e.g., 201c, 202c), and an intermediate section (e.g., 201b, 202b). The interior section is configured to be coupled to an interior surface (associated with 231) of the building 230. The exterior section is configured to be coupled to an exterior surface (associate with 232) of building 230. The intermediate section is coupled to the interior section and to the exterior section, the intermediate section configured to extend from an interior of the building 230 to an exterior of the building 230 via the window. The apparatus 200 further includes a brace 240 configured to extend through the first member. The brace 240 includes a first end configured to be coupled to the interior surface or the exterior surface of the building 230, and a second end operable to adjust an amount that the brace 240 extends through the first member. When the apparatus is installed at the window of the building 230, the two or more members are configured to support the object 120 based at least on: a first force exerted on the interior surface via the interior section, and a second force exerted on the exterior surface via the exterior section.

In another particular implementation of the apparatus 200, the apparatus 200 includes one or more members (e.g., 201, 202) configured to support object 220 at an opening of a structure (e.g., 230), the one or more members define: an interior section (e.g., 201a, 202a) configured to be coupled to the structure (e.g., 230) via a first surface (associated with 231) of the structure, and an exterior section (e.g., 201c, 202c) configured to be coupled to the structure via a second surface (associated with 231) of the structure (e.g., 230). The apparatus 200 further includes brace 240 coupled to the one or more members and that extends through a member of the one or more members. The brace 240 includes: a first end configured to be coupled to the first surface or the second surface of the structure, and a second end operable to adjust an amount that the brace 140 extends through the member.

Thus, FIG. 2 describes apparatus 200 (e.g., a support structure) that includes one or more braces 240 which may be adjusted to secure apparatus 200 with respect to a structure (e.g., a window of a wall/building 230). Additionally, or alternatively, the one or more braces 240 may provide refined fitting adjustments that would otherwise be unavailable in conventional support structures. For example, when the apparatus 200 is adjustable in one or more increments, the one or more braces 240 may advantageously provide additional adjustment/refinement across a range that is greater than or equal to a value of a single increment (e.g., ⅛ inch as an illustrative, non-limiting example). Apparatus 200 may also include one or more support members 204 to reinforce and increase a stability of the apparatus 200. The apparatus 200 may beneficially be securable in such a manner that the apparatus 200 does not damage or otherwise modify the building 230 to which is secured. Additionally, the apparatus 200 may comply with one or more municipal ordinances and other applicable safety requirements.

Figure 3:
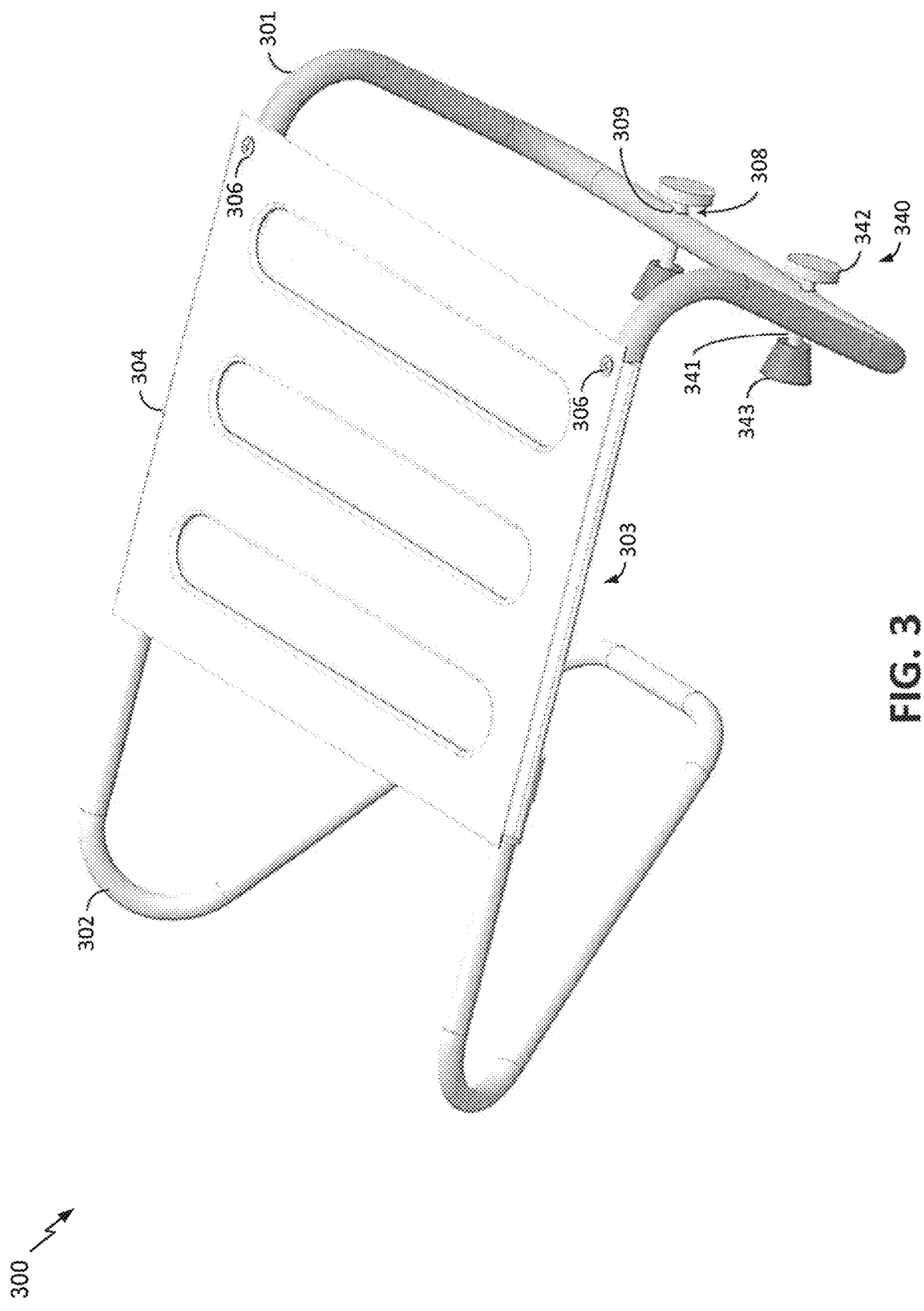
FIG. 3 illustrates an additional example of an apparatus for supporting an object at an opening of a structure.
Figure 3C:
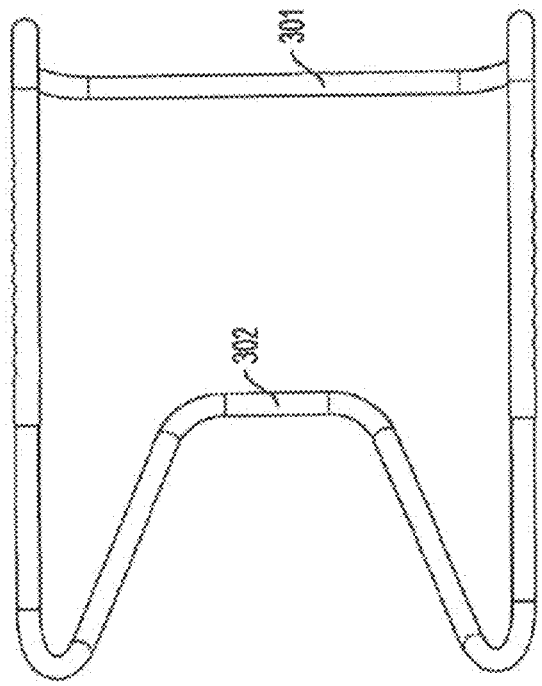
FIG. 3C is another view of the example of the apparatus of FIG. 3.
Figure 3D:
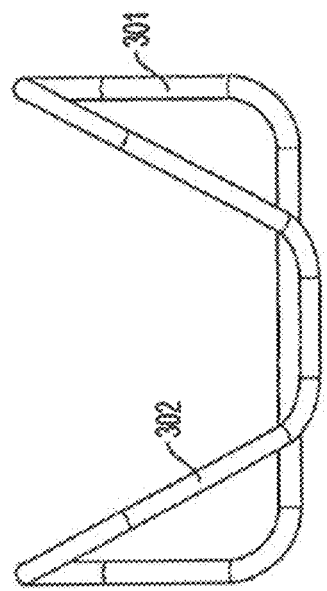
FIG. 3D is another view of the example of the apparatus of FIG. 3.
Figure 3A:
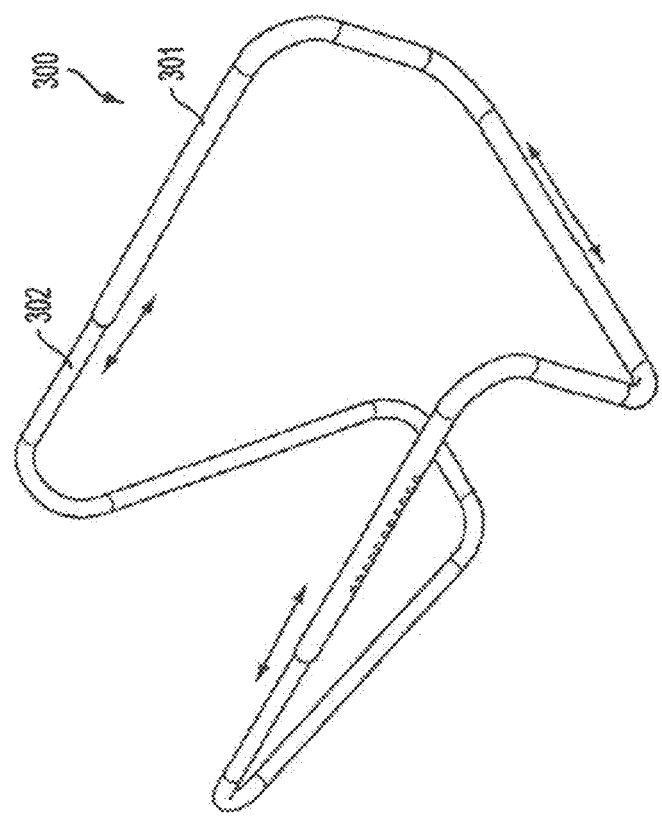
FIG. 3A is another view of the example of the apparatus of FIG. 3.
Figure 3B:
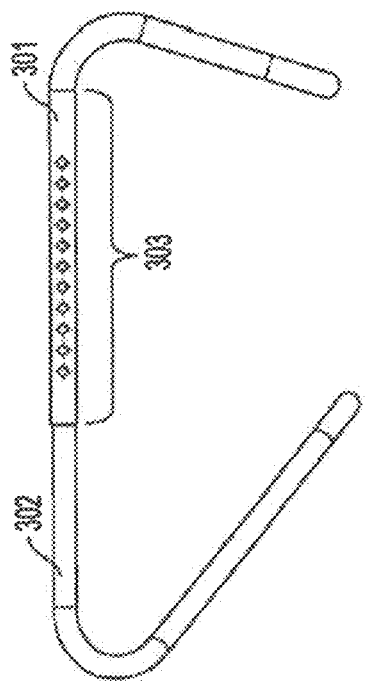
FIG. 3B is another view of the example of the apparatus of FIG. 3.

Referring to FIGS. 3 and 3A-3K, aspects of another example of an apparatus 300 for supporting an object at an opening of a structure. The object may include or correspond to the object 120 of FIG. 1 or the object 220 of FIG. 2. FIG. 3 shows a perspective view of the apparatus 300. FIG. 3A shows another perspective view of apparatus 300, FIG. 3B shows a side view of the apparatus 300, FIG. 3C shows a top view of the apparatus 300, FIG. 3D shows a rear view of the apparatus 300. FIGS. 3E, 3F, 3F-1, and 3G show examples of a first portion (e.g., a first member 301) of the apparatus 300. FIGS. 3H, 3I, 3I-1, and 3J show examples of a second portion (e.g., a second member 302) of the apparatus 300. FIG. 3K shows another side view of the apparatus 300. It is noted that one or more features of apparatus 300 may be omitted from one or more of FIGS. 3, 3A-3K for ease of illustration. Although not explicitly shown, aspects of any one of FIGS. 3, 3A-3K may be present in the others of FIGS. 3, 3A-3K.

Referring to FIGS. 3 and 3A-3K, apparatus 300 includes one or more members, such as first member 301 and second member 302. First member 301 is engaged with second member 302 at sections of first member 301 configured to extend from through an opening of a structure, such as building 130, 230. A lower portion, such as a lower segment, of the first member 301 is configured to be coupled to an interior wall of a structure, such as building 130, 230, and a lower portion, such as a lower segment, of the second member 302, is configured to be coupled to an exterior wall of the structure.

Second member 302 is coupled to first member 301 and is configured to apply an inward force to the exterior surface of the structure (e.g., 130, 230) in response to the downward force exerted by the object (e.g., 120, 220). First member 301 and second member 302 operate to secure the object to the structure without requiring any damage and/or modification to building 130 while complying with stringent municipal ordinances and other applicable safety requirements.

First member 301 is configured to extend at least along a partial width of an aperture, such as an opening or window, of the structure and be coupled to (e.g., directly or via one or more components) an interior surface of the building. In some embodiments, first member 301 may extend along the length of the opening or beyond the width. First member 301 may reversibly engage second member 302 by various attachment mechanisms. By way of example, first member 301 may comprise one or more notches that are configured to accept corresponding protrusions from second member 302 (e.g., by virtue of a male and female arrangement). In any event, first member 301 and second member 302 may form an engaged position such that each is locked with respect to one another and may later be maneuvered by a user to an unengaged position, so that each may be moved or separated from one another. The reversible engagement between first member 301 and second member 302 (whether by a fastener, removable pins, or aligned notches and/or grooves) is advantageous because it allows the dimension of apparatus 300 to be adjusted in terms of length, width, and height to accommodate objects (e.g., 120, 220) of different sizes and each may be folded with respect to one another for packaging, transport, and the like. With each member able to be packaged while being separated from every other member, packaging and transport costs are greatly reduced. For example, the members (and one or more other components of apparatus 300) may be included in a kit, as described further herein at least with reference to FIG. 5. In some implementations, a sealing member configured to seal the interior of the structure from the exterior of the structure may be formed around the sections of first member 301 extending from the interior of the structure to the exterior of the structure (or second member 302) and the surface of a window at second member 302.

First member 301 is variable along the width of the opening (e.g., a window) so that apparatus 300 may be utilized with windows of different widths. The adjustments should be sufficient to permit a width of first member 301 to be adjusted to stabilize object 120 or otherwise exert sufficient force to the interior surface of building 130. In some embodiments, the width of first member 301 is adjusted so that first member 301 is sufficiently wider than a width of the opening. As shown, first member 301 includes a central section and two distal sections that extend from the interior of the building to the exterior of the building, each of which may be actuated between a retracted and extended position to ensure a desired length. The effective length of these sections may be fixed at different lengths by a reversible fastener means, one or more securing pins or bolts, or a latch mechanism. In some implementations, a soft material, such as rubber or a rubber composite, may cover first member 301 to prevent and/or prohibit (e.g., reduce) damage to the interior surface and/or window surrounding.

The intermediate sections of second member 302 mate with, and extend from, corresponding intermediate sections of first member 301. The mated intermediate sections of first member 301 and second member 302 form sections of a top surface that may support an object. The lengths of these sections of second member 302 may be adjusted to accommodate different objects 120 and building walls of different thickness. In some implementations, the intermediate sections of second member 302 may include an outer sleeve that slides along the length of the intermediate sections of first member 301 extending from the interior of the structure. In that case, the intermediate sections of member 301 may be thought of as inner sleeves, where the length of apparatus 300 is adjusted by sliding the intermediate sections of first member 301 along the lengths of corresponding intermediate sections of second member 302. Length adjustments may be performed by aligning appropriate apertures in the inner sleeve and outer sleeve and inserting a securing pin or fastener through the aligned apertures. Length adjustments may also be performed by sliding the sleeves or segments along a series notches or grooves so that it each is seated in a desired notch or groove at the desired length.

Further, it should be appreciated that second member 302 may be configured with or include other structures that may be configured according to specific dimensions of the object. For example, second member 302 may be configured with one or more support members 304 (not illustrated in FIGS. 3A-3K) extending between its intermediate sections. When the apparatus 300 includes multiple support structures, such as two or more rods, the spacing between the multiple rods or beams may be configured be a user to support the edges of the object. Such a configuration may inhibit object from becoming lopsided due to high winds, unbalanced weight, and the like. The one or more support members 304 may be coupled to the first member 301 and/or the second member 302. For example, the one or more support members 304 may be coupled to the first member 301 and/or the second member 302 via one or more fasteners 306, such as a screw, bolt, pin, rivet, clip, adhesive, weld, and/or the like, as illustrative, non-limiting examples. Additionally, or alternatively, the one or more members 304 may be formed (e.g., shaped) so as to couple to the first member 301 and/or the second member 302. To illustrate, an edge of the one or more members 304 may be curved to have a "snap-fit" with the first member 301 and/or the second member 302.

The lower section of second member 302 extends to building 130 at an angle from its intermediate, top-most sections, i.e., where object 120 exerts a downward force. Accordingly, second member 302 structurally operates to resist the downward force exerted by object 120 that would otherwise cause the object to fall to the surface or rotate inward toward the structure. As such, second member 302 provides a supportive force, where the supportive force has at least a component perpendicular to the exterior surface of the structure, keeping the object separate from the structure. Further, first member 301 provides an equal, opposing supporting force perpendicular to the interior surface of building 130. In this way, first member 301 and second member 302 restrain motion of the object with respect to the structure.

The effective length of second member 302 and the angles at which it extends toward the structure (e.g., 130) may vary according to different considerations. For example, 1) the orthogonal or near orthogonal distance from the surface of structure at which intermediate sections of second member 302 meet corresponding sections of first member 301, and/or 2) the distance below first member 301 at which second member 302 abuts the surface of the structure may be varied. This may be done to accommodate objects of different lengths, city ordinances, applicable safety regulations, and the like. In some implementations, the distance from the surface of the structure at which second member 302 couples with first member 301 may be varied by sliding the end of each intermediate section along a series of notches or grooves so that they may be seated in a desired notch or groove. According other embodiments, intermediate sections of second member 302 can be adjusted along the length of intermediate sections of member 301 by nut and bolt combinations, screws, or a reversible fastening mechanism, such as adjustable clamping or biasing means. For example, according to one embodiment, second member 302 may be attached to second member intermediate section of first member 301 by a bolt or pin inserted through a pair of aligned apertures in each (defined through either the horizontal or vertical surfaces of each).

The lower distal end of second member 302 that is coupled to the structure. In some implementations when second member abuts the structure, the lower distal end of second member may be adjustable so that it remains flush against the surface of the structure even where the angle of the lower section of second member 302 changes with respect to the surface of building 130. In a particular implementation, the lower section of second member 302 comprises an adhesive material that provides sufficient resistance to alter movement. In another implementation, the lower section of second member 302 may be in combination with or comprise a foot such as a resilient, vibration isolation pad secured thereto, which effectively serves as a "non-skid" pad.

Referring to FIG. 3B, as shown, the effective length of apparatus 300 may be varied by fixing intermediate sections of member 302 along corresponding intermediate sections of first member 301. This is done utilizing length adjustment mechanism 303 (e.g., an adjustment mechanism), which may be a mechanism as described herein at least with reference to FIGS. 3A-3K. An alternative adjustment mechanism 303 is described herein at least with reference to FIGS. 7A-7G. As an illustrative, non-limiting example of apparatus 300, the effective length of apparatus 300 may be approximately 20 inches, an effective height of first member 301 may be approximately 8.5 inches, and an effective height of second member 302 may be approximately 9 inches. In this example, along its lower segment, the distance from the outer most piece of second member 302 to the inner most piece of second member 302 may be approximately 8.43 inches. Additionally, or alternatively, in this example, along its lower segment, the distance from the inner most piece of first member 301 to the outer most piece of first member 301 may be approximately 2.5 inches.

Referring to FIG. 3A, apparatus 300 includes one or more braces 340. The one or more braces 340 are adjustable and may be operated to securely and removably (e.g., releasably) couple the apparatus 300 to the structure (e.g., 130, 230). For example, the one or more braces 340 may secure the apparatus 300 in such a manner that the apparatus 300 does not damage or otherwise modify the structure to which the apparatus 300 is secured. The one or more braces 340 may be adjustable over a range (e.g., a distance) to enable the apparatus 300 to be customized to one or more openings (e.g., windows) and/or structures (e.g., buildings 130, 230). When the apparatus 300 includes multiple braces, each brace may be adjustable independent of the other braces to account for an uneven surface between braces coupled to the same surface and/or to secure/stabilize attachment of the apparatus 300 at each brace. It is noted that the location of the one or more braces 340 shown in FIG. 3 are for illustration purposes only, and that the one or more braces 340 may be positioned at other locations on the apparatus 300. Additionally one or more braces as represented may be removed or one or more additional brace may be added. For example, as shown in FIG. 3, the one or more braces 340 are coupled to the first member 301; however, in other implementations, one or more braces 340 may be coupled to second member 302 and/or may one or more braces may not be coupled to first member 301.

As shown, the one or more braces 340 are coupled to the first member 301 and extend through the first member 301. For example, a brace 340 may extend through one or more apertures, such as a representative aperture 308, of the first member 301. To illustrate, in some implementations, the first member includes a first aperture on a first side of the first member 301 and a second aperture on a second side of the first member 301. The first aperture may be coupled to the second aperture via a conduit, such as a threaded conduit configured to receive the brace. In a particular implementation, the conduit may be included in a fitting 309 that is coupled to the first member 301 (e.g., inserted in the member through the first and second apertures, and secured to the first member 301).

As shown, brace 340 includes a first end configured to be coupled to the interior surface of the structure, and a second end operable to adjust an amount that the brace 340 extends through the first member 301. The brace 340 may include a shaft 341 that extends through the aperture (e.g., 308) of the first member 301. The shaft 341 includes a first end and a second end. In some implementations, at least a portion (e.g., 344 of FIG. 3K) of the shaft 341 is threaded and is configured to engage the aperture (e.g., 308) and/or a threaded fitting (e.g., 309) coupled to the aperture. The brace 340 may also include an adjustment mechanism 342 coupled to the first end and configured to adjust a position of the brace 340 with respect to the aperture 308 (e.g., with respect to the first member 301 through which the brace 340 extends). For example, when the shaft 341 includes a threaded portion (e.g., 344), the adjustment mechanism 342 may be configured to enable rotation of the shaft 341, in some implementations, the shaft 341 and the adjustment mechanism are incorporated into a thumbscrew. The second end of the shaft 341 may be configured to be coupled to (or contact) the interior surface the structure. In some implementations, the brace 340 includes a foot 343 coupled to the second end and configured to be coupled to (e.g., contact) the interior surface of the structure. In some implementations, the foot 343 may be rotatably coupled to the second end of the shaft 341 to enable a surface of the foot 343 (that contacts a surface) to adjust to the surface, which may not be exactly flat, may be not be exactly vertical, and/or may not be exactly perpendicular to a longitudinal axis of the shaft 341. Additionally, or alternatively, a contact surface of the foot 343 may include a resilient, vibration isolation pad secured thereto, which effectively serves as a "non-skid" pad. Additionally, or alternatively, the foot 343 may be out of a resilient material (e.g., rubber or rubber composite) and/or the contact surface may be textured, ridged, grooved, and/or the like.

As shown in FIG. 3, apparatus 300 includes a first brace (e.g., 340) and a second brace (e.g., 340) configured to extend through the first member 301. Accordingly, the first member 301 includes a first aperture (e.g., 308) through which the first brace extends, and a second aperture through which the second brace extends.

FIG. 3B is a side view of apparatus 300. According to the illustrated embodiment, the effective length of apparatus 300 may be varied by fixing intermediate sections of member 302 along corresponding intermediate sections of first member 301. This is done utilizing length adjustment mechanism 303, which may be a mechanism as described herein. From FIG. 3B, the effective length of apparatus 300 in the illustrated configuration is approximately 20 inches. The effective height of first member 301 in the illustrated configuration is approximately 8.5 inches, while the effective height of second member 302 in the illustrated configuration is approximately 9 inches. Along its lower segment, the distance from the outer most piece of second member 302 to the inner most piece of second member 302 in the illustrated configuration is approximately 8.43 inches. Along its lower segment, the distance from the inner most piece of first member 301 to the outer most piece of first member 301 in the illustrated configuration is approximately 2.5 inches.

Figure 3F:
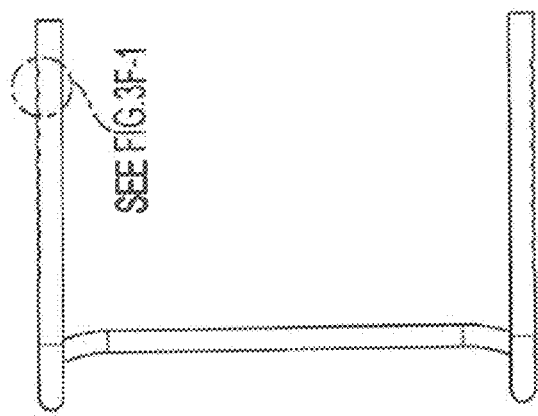
Figure 3G:
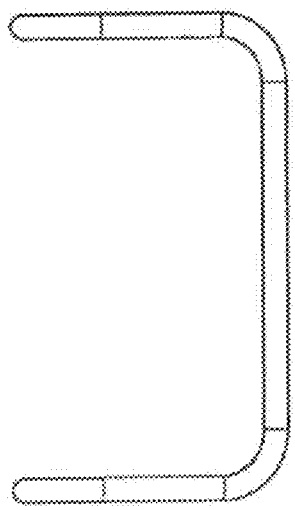
FIG. 3G is another view of the example of the apparatus of FIG. 3.

Referring to FIGS. 3E, 3F, 3F-1, and 3G, FIG. 3E is a side view of first member 301, FIGS. 3F and 3F-1 are top views of first member 301, and FIG. 3G is a rear view of first member 301. Consistent with the foregoing, the effective length of apparatus 300 may be varied by fixing intermediate sections of first member 301 along corresponding intermediate sections of second member 302 (not illustrated) utilizing length adjustment mechanism 303. As shown, length adjustment mechanism 303 comprises eleven apertures in first member 301, where the apertures are placed along the outside of the tube of first member 301, but not the inside of the tube as well. In other implementation, the apertures are placed on the inside of the tube, along the outside of the tube, or both. Additionally, although shown as having eleven apertures, in other implementations, more than or fewer than eleven apertures may be included. In an illustrative, non-limiting example, each aperture has a diameter of 0.266 inches, the apertures are evenly spaced, and an angle of the lower section of first member 301 with respect to the intermediate section of first member 301 is approximate 72.57 degrees.

Figure 3E:
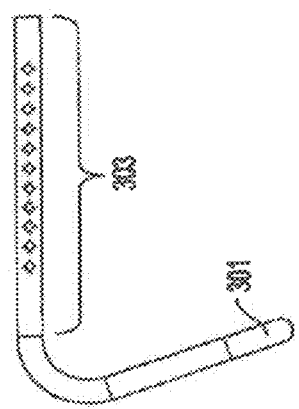
FIG. 3E is another view of the example of the apparatus of FIG. 3.
Figures 1, 3F:
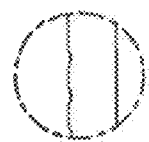
Figure 3I:
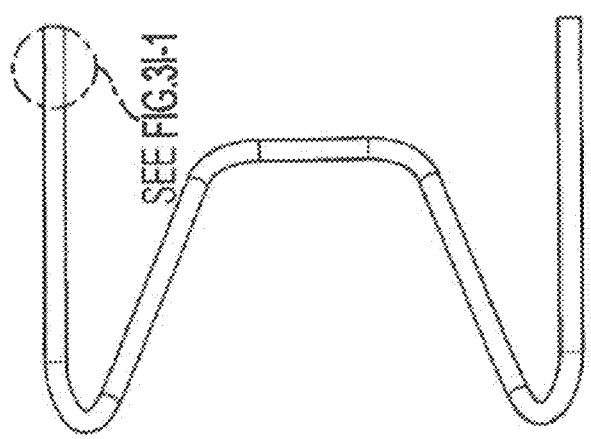
Figure 3J:
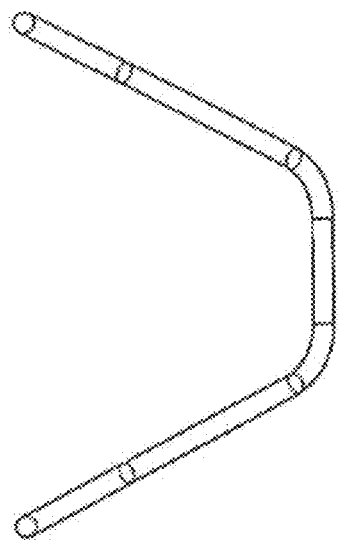
FIG. 3J is another view of the example of the apparatus of FIG. 3.
Figure 3H:
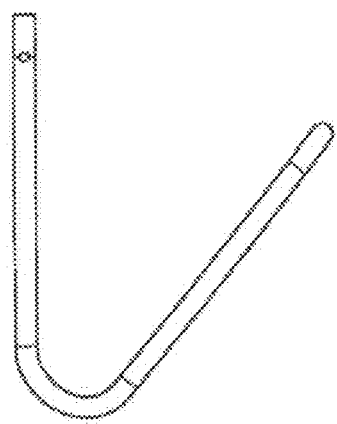
FIG. 3H is another view of the example of the apparatus of FIG. 3.
Figures 1, 3I:
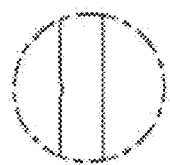

Referring to FIGS. 3H, 3I, 3I-1, and 3J, FIG. 3H is a side view of second member 302, FIGS. 3I and 3I-1 are top views of second member 302, and FIG. 3J is a rear view of second member 302. Consistent with the foregoing, the effective length of apparatus 300 may be varied by fixing intermediate sections of second member 302 along corresponding intermediate sections of first member 301 (not illustrated) utilizing length adjustment mechanism 303. As shown, length adjustment mechanism 303 comprises an aperture in second member 302, where the aperture is placed along the outside of the tube of second member 302, but not the inside of the tube as well. In other implementation, the apertures are placed on the inside of the tube, along the outside of the tube, or both. The aperture in second member 302 may align with any of the apertures in first member 301 and receive a fastening means there through. In an illustrative, non-limiting example, the aperture has a diameter of 0.266 inches, the angle of the lower section of second member 302 with respect to the intermediate section of second member 302 is approximately 37.79 degrees, or both. As best seen from FIGS. 3I and 3J, the lower section of second member 302 tapers as it extends downward. In such implementations, a width at the lower-most section is approximately 3.07 inches, while its width at the upper-most section is approximately 14.54 inches.

Referring to FIG. 3K, an example of apparatus 300 in relation to a structure 330 is shown. The structure 330 may include or correspond to building 130, 230. The apparatus 300 includes first member 301 coupled to second member 302. Although described as having two members, in other implementations, apparatus 300 may have a single member or more have more than two members. The first member 301 coupled to the second member 302 may define a first region 350, a second region 351, and a third region 352 (e.g., an intermediate region). As shown, apparatus 300 is installed at structure 330 having a first surface 331 and a second surface 332. Although the first surface 331 is shown as not being vertical and/or not being parallel with respect to the second surface 332, in other implementations, the first surface 331 may be vertical and/or may be parallel with respect to the second surface 332. Additionally, structure 330 may include a ledge 333, which may be associated with or include a sill of a window (e.g., a window sill).

As shown, the apparatus 300 is placed about the structure 330 such that the lower segment of first member 301 is configured to be coupled to the first surface 331 and the lower segment of second member 302 is configured to be coupled to the second surface 332. As described, length adjustment mechanism 303 may be utilized to adjust the effective length, and corresponding, a distance D1 between the lower segment of first member 301 and the lower segment of second member 302. Doing so is intended to bias (e.g., move) first member 301 toward the first surface 331 and bias (e.g., move) second member 302 toward the second surface 332 exterior. However, in some cases, length adjustment mechanism 303 can, at best, provide incremental changes where adjustments are made at, e.g., ⅛ inch increments. Such incremental adjustments may not enable the apparatus 300 (e.g., the first member 301 and the second member 302) to be securely coupled to the structure (e.g., the distance D1 may not be able to match a thickness of the structure 330) such that the effective length of apparatus 300 cannot be set so that it fits the wall without play. Additionally, in other situations as shown, a configuration of the structure 330 (e.g., ledge 333) may prohibit the first member 301 from being positioned within an adjustment range (e.g., a ⅛ increment) from the first surface 331. To illustrate, a distance D2 between the first surface 331 and the first member 301 may be dictated based on a configuration of the structure 330 and/or an adjustment range of the length adjustment mechanism 303.

In such situations, brace 340 can be adjusted to extend (to secure) or retract (to release) as indicated by arrow 348. To illustrate, brace 340 may be operated to adjust a position of the brace 340 with respect to the first member 301 to cause the foot 343 to contact the first surface 331, thereby securing the apparatus 300 to the structure 330. An object can be supported by the apparatus 300 (after the apparatus 300 is securely installed) 130 by virtue of the physical arrangement between first member 301 and second member 302 (and the one or more braces 340), because the physical arrangement of those components provides sufficient forces against both the first and second surfaces of the structure 330 in response to the downward force exerted by the object on the apparatus 300. By virtue of the arrangement of the apparatus 300, the surfaces of the structure 330 are leveraged to secure the object thereto. That is, according to the apparatus 300 of FIGS. 3, 3A-3K, the downward force exerted by object on apparatus 300 operates to bias first member 301 (and brace 340) toward the first surface 331 of structure 330. In doing so, the bias is of sufficient magnitude to hold first member 301 (and brace 340) at a fixed position at the first surface 331. Simultaneously, the downward force exerted by object on apparatus 300 operates to bias second member 302 toward second surface 332.

In some implementations, apparatus 300 may further comprise level indicator (not shown), which includes a bubble floating in a liquid contained in an elongated, clear tube. The level indicator may include or correspond to the level indicator 105 of FIG. 1. The level indicator may also include a first line disposed across the tube toward the distal end thereof and a second line disposed across the tube toward the proximal end thereof. After placing the object in an initial position, reference may be made to level indicator the. The level indicator may be included on, or incorporated in, one or more of the first member 301, the second member 302, or one or more of one or more support structures (e.g., 304).

In a particular implementation of the apparatus 300, the apparatus (that, when installed at a window of the building (e.g., 330), is configured to support object (e.g., 120, 220) at the window of the building) and includes two or more members (e.g., 301, 302). The two or more members include a first member and a second member that, when coupled together, define an interior section (e.g., 350), an exterior section (e.g., 351), and an intermediate section (e.g., 352). The interior section is configured to be coupled to an interior surface (e.g., 331) of the building. The exterior section is configured to be coupled to an exterior surface (e.g., 332) of building. The intermediate section is coupled to the interior section and to the exterior section, the intermediate section configured to extend from an interior of the building to an exterior of the building via the window. The apparatus 300 further includes a brace 340 configured to extend through the first member. The brace 340 includes a first end configured to be coupled to the interior surface or the exterior surface of the building, and a second end operable to adjust an amount that the brace 340 extends through the first member. When the apparatus is installed at the window of the building, the two or more members are configured to support the object based at least on: a first force exerted on the interior surface via the interior section, and a second force exerted on the exterior surface via the exterior section.

In another particular implementation of the apparatus 300, the apparatus 300 includes one or more members (e.g., 301, 302) configured to support an object at an opening of a structure 330, the one or more members define: a first 350 section configured to be coupled to the structure 330 via a first surface 331 of the structure 330, and a second section 351 configured to be coupled to the structure 330 via a second surface 332 of the structure 330. The apparatus 300 further includes brace 340 coupled to the one or more members and that extends through a member of the one or more members. The brace 3440 includes: a first end configured to be coupled to the first surface or the second surface of the structure, and a second end operable to adjust an amount that the brace 340 extends through the member.

Thus, FIGS. 3, 3A-3K describes apparatus 300 (e.g., a support structure) that includes one or more braces 340 which may be adjusted to secure apparatus 300 with respect to a structure 330. Additionally, or alternatively, the one or more braces 340 may provide adjustment (e.g., refined fitting adjustments) that would otherwise be unavailable in conventional support structures. For example, when the apparatus 300 is adjustable in one or more increments, the one or more braces 340 may advantageously provide additional adjustment/refinement across a range that is greater than or equal to a value of a single increment (e.g., ⅛ inch as an illustrative, non-limiting example). As another example, in situations where a configuration of the structure 330 (e.g., the ledge) provides a physical obstacle, the one or more braces 340 may be adjusted to secure the apparatus without having to physically alter (e.g., deform or bend) the apparatus 300 which may reduce safety and an effectiveness of the apparatus 300. Apparatus 300 may also include one or more support members 104 to reinforce and increase a stability of the apparatus 300. The apparatus 300 may beneficially be securable in such a manner that the apparatus 300 does not damage or otherwise modify structure 330 to which is secured. Additionally, the apparatus 300 may comply with one or more municipal ordinances and other applicable safety requirements.

Figure 4:
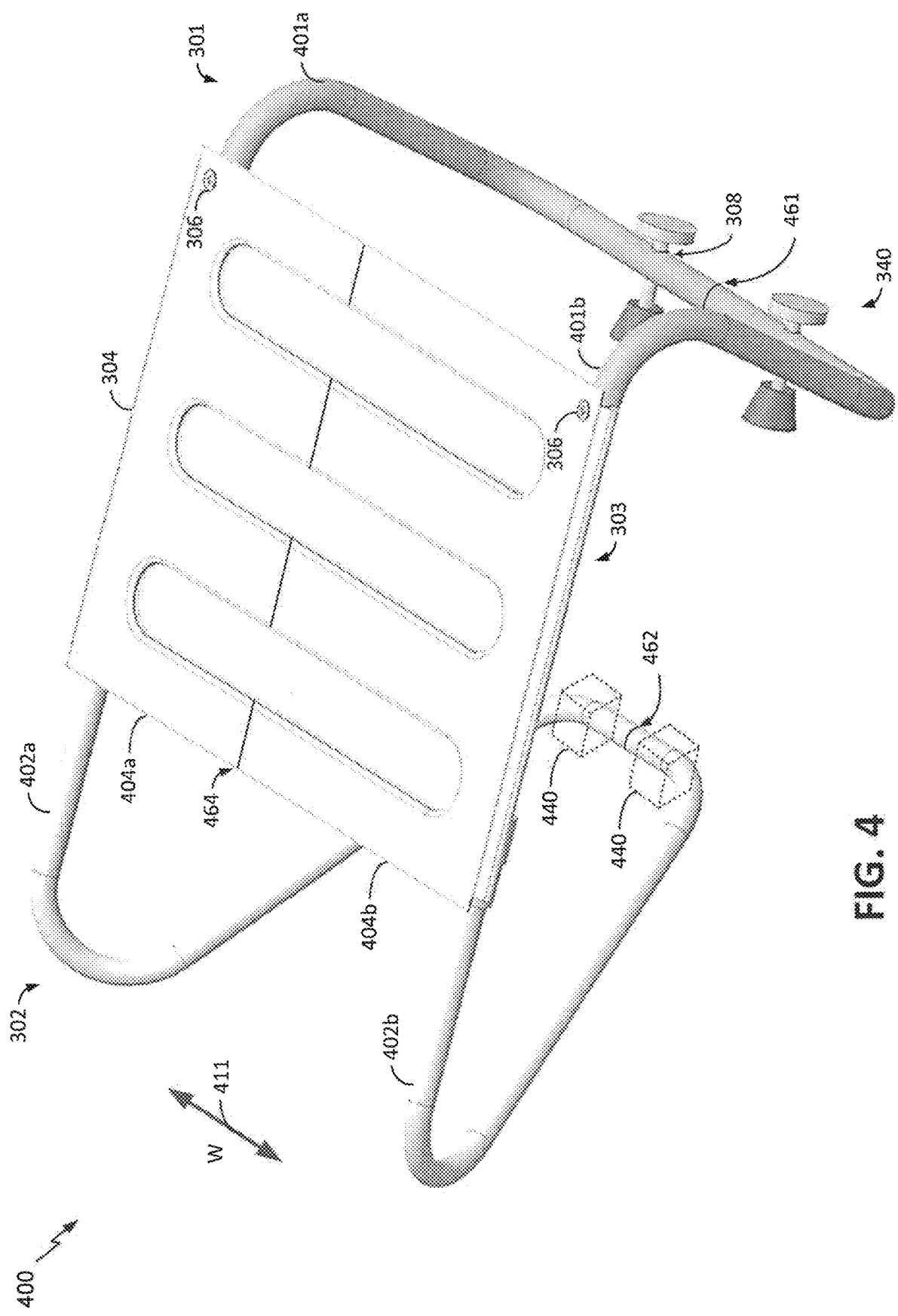
FIG. 4 illustrates an additional example of an apparatus for supporting an object at an opening of a structure.

Referring to FIG. 4, an additional example of 400 apparatus for supporting an object at an opening of a structure is shown. The apparatus 400 corresponds to the apparatus 300, however, as compared to the apparatus 300, the apparatus 400 is adjustable to fit a width W, as indicated by arrow 411, of the opening of the structure (e.g., 330). For example, each of first member 301 and second member 302 may include multiple sub-members. As shown, the apparatus 400 includes an adjustment mechanism 303, which may include the adjustment mechanism as described with reference to FIGS. 3A-3K or FIGS. 7A-7G.

First member 301 includes a first sub-member 401a and a second sub-member 401b. In some implementations, each are reversibly coupled to one another and slide or move with respect to one another to vary the dimensions of apparatus 400. To illustrate, first sub-member 401a and second sub-member 401b may be reversibly coupled in an adjustable manner (at a location indicated by arrow 461), such as an outer sleeve of first sub-member 401a that slides along the length of second sub-member 401b. The location may be positioned between braces 340 coupled to the first member 301. Adjustments may be performed by aligning appropriate apertures in the inner sleeve and outer sleeve and inserting a securing pin or fastener through the aligned apertures. Additionally, or alternatively, position of the first sub-member 401a and second sub-member 401b may be fixed by a reversible fastener means, one or more securing pins or bolts, or a latch mechanism. Adjustments may also be performed by sliding the sleeves or segments along a series notches or grooves so that it each is seated in a desired notch or groove at the desired length. In other implementations, first member 301 includes another sub-member that is configured to be coupled between first sub-member 401a and second sub-member 401b.

Second member 302 includes a third sub-member 402a and a fourth sub-member 402b. In some implementations, each are reversibly coupled to one another and slide or move with respect to one another to vary the dimensions of apparatus 400. To illustrate, third sub-member 402a and fourth sub-member 402b may be reversibly coupled in an adjustable manner (at a location indicated by arrow 462), such as an outer sleeve of third sub-member 402a that slides along the length of fourth sub-member 402b. Adjustments may be performed by aligning appropriate apertures in the inner sleeve and outer sleeve and inserting a securing pin or fastener through the aligned apertures. Additionally, or alternatively, position of the third sub-member 402a and fourth sub-member 402b may be fixed by a reversible fastener means, one or more securing pins or bolts, or a latch mechanism. Adjustments may also be performed by sliding the sleeves or segments along a series notches or grooves so that it each is seated in a desired notch or groove at the desired length, in other implementations, second member 302 includes another sub-member that is configured to be coupled between third sub-member 402a and fourth sub-member 402b.

Apparatus 400 may include one or more braces 440 (as indicated by dashed boxes) coupled to second member 302. The one or more braces 440 may include or correspond to the braces 140, 240, 340. The location indicated by arrow 462 may be positioned between two braces 440. The lower segment of second member 302 is configured to be coupled to the second surface 332 of structure 330. Braces 440 can be adjusted to extend (to secure) or retract (to release) the apparatus 400. To illustrate, brace 440 may be operated to adjust a position of the brace 440 with respect to the second member 302 to cause a foot (e.g., 343) to contact the second surface 332, thereby securing the apparatus 400 to the structure 330. An object can be supported by the apparatus 300 (after the apparatus 300 is securely installed) 130 by virtue of the physical arrangement between first member 301 (and the one or more braces 340) and second member 302 (and the one or more braces 440), because the physical arrangement of those components provides sufficient forces against both the first and second surfaces of the structure 330 in response to the downward force exerted by the object on the apparatus 300.

In some implementations, the one or more support members 304 may include a first portion 404a and a second portion 404b that our coupled together as indicated by arrow 464. The one or more support members 304 may be adjustable to conform with a width W of the apparatus 400.

Although describes as having braces 340, 440, in other implementations, one or more of braces 340, 440 may not be included in apparatus 400. In some implementations, apparatus 400 may further comprise level indicator (not shown), which includes a bubble floating in a liquid contained in an elongated, clear tube. The level indicator may include or correspond to the level indicator 105 of FIG. 1. The level indicator may also include a first line disposed across the tube toward the distal end thereof and a second line disposed across the tube toward the proximal end thereof. After placing the object in an initial position, reference may be made to level indicator the. The level indicator may be included on, or incorporated in, one or more of the first member 301, the second member 302, or one or more of one or more support structures (e.g., 304).

Thus, the apparatus 400 of FIG. 4 is selectively configurable to fit a width of an opening. Additionally, as shown, apparatus 400 includes a set of one or more braces 340 coupled to the first member 301 and a second set of one or more braces 440 coupled to the second member 302. The first and second sets of braces provide for further adjustment of the apparatus to releasably secure the apparatus 400 to a first surface (e.g., 331) and a second surface (e.g., 332) of a structure (e.g., 330).

Figure 5:
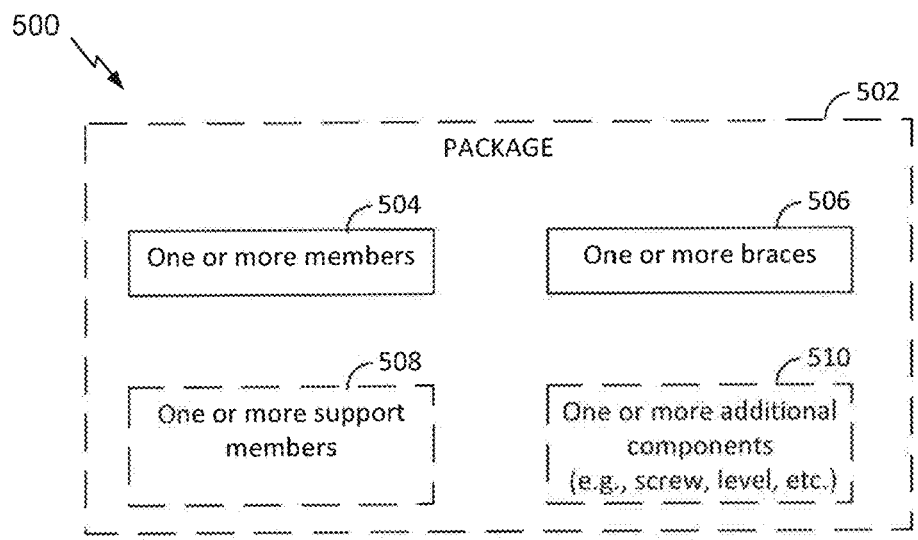
FIG. 5 illustrates an example of a kit for an apparatus for supporting an object at an opening of a structure.

Referring to FIG. 5, and example of a kit 500 for an apparatus for supporting an object at an opening of a structure. For example, the opening may include or correspond to a window of a building. The apparatus may include or correspond to the apparatus 100 of FIG. 1, the apparatus 200 of FIG. 2, the apparatus 300 of FIGS. 3, 3A-3K, the apparatus 400 of FIG. 4, or a combination thereof.

Kit 500 includes one or more members 504 and one or more braces. The one or more members may include or correspond to first member 101, second member 102, and third member 103 of FIG. 1, first member 201 and second member 202 of FIG. 2, first member 301 and second member 302 of FIGS. 3, 3A-3K, first member 401 (e.g., first sub-member 401a and second sub-member 401b) and second member 402 (e.g., third sub-member 402a and fourth sub-member 402b), one or more other members, or a combination thereof. The one or more braces may include or correspond to brace(s) 140 of FIG. 1, brace(s) 240 of FIG. 2, brace(s) 340 of FIGS. 3, 3A-3K, brace(s) 440 of FIG. 4, or a combination thereof.

In some implementations, kit 500 may also include one or more support members 508, one or more additional components 510, or a combination thereof. The one or more support members 508 may include or correspond to one or more support structures (e.g., 104) of FIGS. 1 and 3, one or more support members (e.g., 304) of FIGS. 3, 3A-3K, one or more support members (e.g. 404), such as a first portion 404a and a second portion 404b, of FIG. 4, or a combination thereof. The one or more additional components 510 may include or correspond to a level (e.g., 105), one or more screws/bolts (e.g., 306, 406), written instructions, and/or other components. Additionally, or alternatively, the one or more additional components 510 may include one or more adjustment mechanisms, such as the adjustment mechanism 303 (as described with reference to FIGS. 7A-7G.

In some implementations, kit 500 may include a package 502. For example, package 502 may include a box, a bag, a container, or the like. Package 502 may include the one or more members 504 and the one or more braces 506. In some implementations, package 502 may include the one or more support members 508, the one or more additional components 510, or a combination thereof. Additionally, or alternatively, package 502 may include a packaging medium (e.g., packaging material), such as foam, paper, or the like.

In a particular implementation, kit 500 for an apparatus is disclosed, such that the apparatus, when installed at a window of a building, is configured to support an object at the window of the building. The kit 500 includes one or more members 504 that define an interior section and an exterior section. In some implementations, kit 500 includes two or more members (e.g., 504) that, when coupled together, define an interior section configured to be coupled to an interior surface of the building and an exterior section configured to be coupled to an exterior surface of building. In some implementations, the two or more members (e.g., 504), when coupled together, may further define an intermediate section coupled to the interior section and to the exterior section, the intermediate section configured to extend from an interior of the building to an exterior of the building via the window. The kit 500 further includes a brace (e.g., 506) configured to extend through a member of the one or more members. The brace includes a first end configured to be coupled to the interior surface or the exterior surface of the building, and a second end operable to adjust an amount that the brace extends through the member. In some implementations of the kit 500, the kit 500 further includes package 502 that includes the one or more members (e.g., 504) and the brace (e.g., 506). Additionally, or alternatively, in some implementations, the one or more members comprise at least a first member and a second member, and the first member and the second member are configured to be reversibly coupled to each other.

Thus, FIG. 5 describes kit 500 for an apparatus (e.g., a support structure) that includes one or more braces 506 which may be adjusted to secure the apparatus with respect to a structure (e.g., a window of a wall/building). Additionally, or alternatively, the one or more braces 506 may provide refined fitting adjustments that would otherwise be unavailable in conventional support structures. For example, when the apparatus 200 is adjustable in one or more increments, the one or more braces 506 may advantageously provide additional adjustment/refinement across a range that is greater than or equal to a value of a single increment (e.g., ⅛ inch as an illustrative, non-limiting example). The apparatus may comply with one or more municipal ordinances and other applicable safety requirements.

Figure 6:
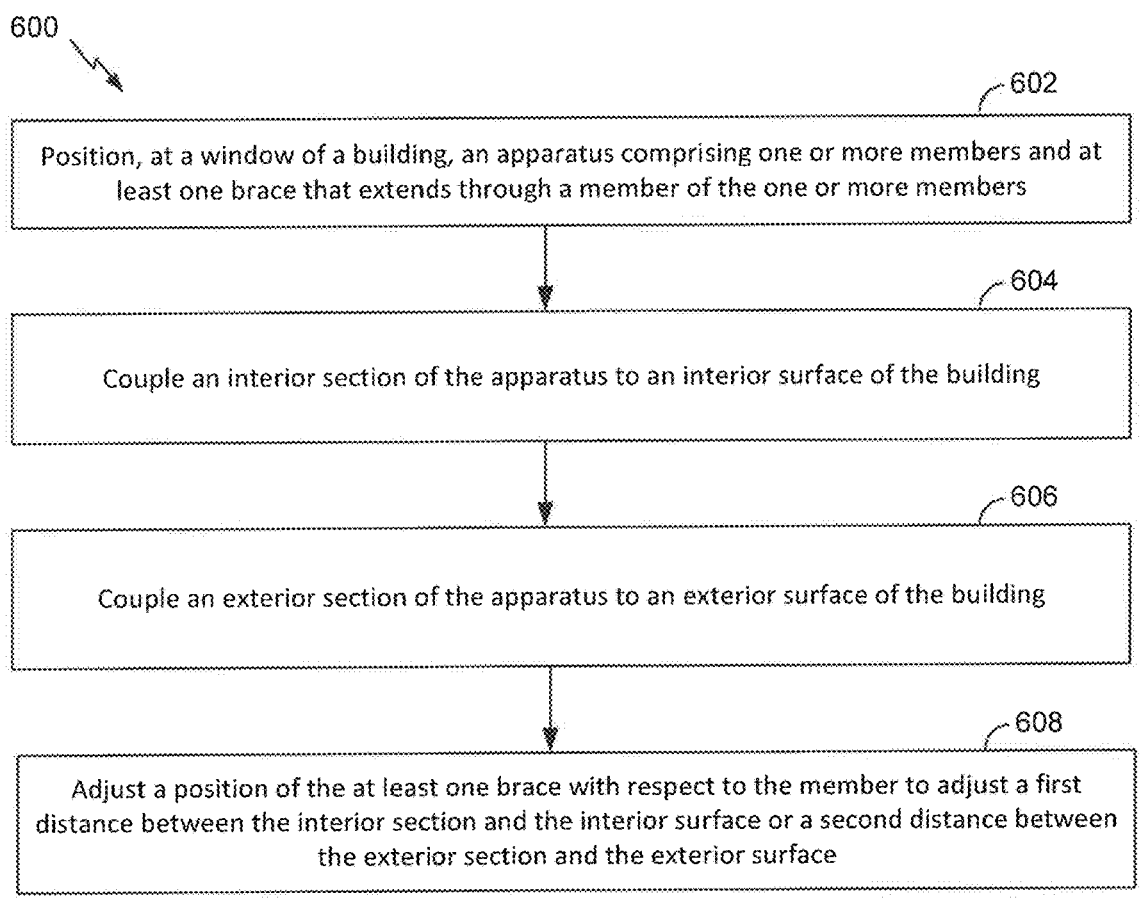
FIG. 6 illustrates a flow diagram of an example of a method of installing an apparatus for supporting an object at an opening of a structure.

Referring to FIG. 6, a method 600 of installing an apparatus (e.g., a support structure) is shown. For example, of installing an apparatus for supporting an object at an opening of a structure, such as at a window of a building. The method 600 may be performed on an apparatus, such as the apparatus 100 of FIG. 1, the apparatus 200 of FIG. 2, the apparatus 300 of FIGS. 3, 3A-3K, the apparatus 400 of FIG. 4, or a combination thereof, or a kit, such as kit 500 of FIG. 5.

The method 600 includes positioning, a window of a building, an apparatus comprising one or more members and at least one brace that extends through a member of the one or more members, at 602. For example, the one or more members may include or correspond to first member 101, second member 102, and third member 103 of FIG. 1, first member 201 and second member 202 of FIG. 2, first member 301 and second member 302 of FIGS. 3, 3A-3K, first member 401 (e.g., first sub-member 401a and second sub-member 401b) and second member 402 (e.g., third sub-member 402a and fourth sub-member 402b), the one or more members 504 of FIG. 5, one or more other members, or a combination thereof. The at least one brace may include or correspond to brace(s) 140 of FIG. 1, brace(s) 240 of FIG. 2, brace(s) 340 of FIGS. 3, 3A-3K, brace(s) 440 of FIG. 4, the one or more braces 506 of FIG. 5, or a combination thereof. In some implementations, positioning the apparatus at the window of the building includes positioning an intermediate section of the apparatus on a sill of the window.

The method 600 also includes coupling an interior section of the apparatus to an interior surface of the building, at 604, and coupling an exterior section of the apparatus to an exterior surface of the building, at 606. The method 600 further adjusting a portion of the at least one brace with respect to the member to adjust a first distance between the interior section of the interior surface or a second distance between the exterior section and the exterior surface, at 608. In some implementations, adjusting the position of the at least one brace may include contacting a first end of the brace to the interior surface or the exterior surface, and rotating a second end of the brace.

In some implementations, the method 600 may include adjusting a position of the first member relative to the second member using a length adjustment mechanism, such as the length adjustment mechanism 303 as described with reference to FIGS. 3A-3K or 7A-7G. For example, the length adjustment mechanism may include enable a position of the first member to be adjusted relative to the second member, and/or may enable a position of the first member to be secured relative to the second member.

Thus, the method 600 of FIG. 6 enables installation of an with respect to a structure (e.g., a window of a wall/building). The apparatus may beneficially be securable in such a manner that the apparatus does not damage or otherwise modify the building to which is secured. Additionally, the apparatus may comply with one or more municipal ordinances and other applicable safety requirements. Additionally, or alternatively, the one or more braces may provide refined fitting adjustments that would otherwise be unavailable. Additionally, or alternatively, components of systems and apparatuses described here may advantageously comprise one or a combination of lightweight materials that impart sufficient strength such as, for example, steel, aluminum, or fiber-reinforced plastic, and the like. Accordingly, the entire weight of the object may supported by systems and apparatuses without modification and/or damage to the structure to which the systems and apparatuses are adjoined. Furthermore, in some implementations, the apparatus may have a module design to enable compact packaging and/or an easily assembled and installed support structure.

Figure 7A:
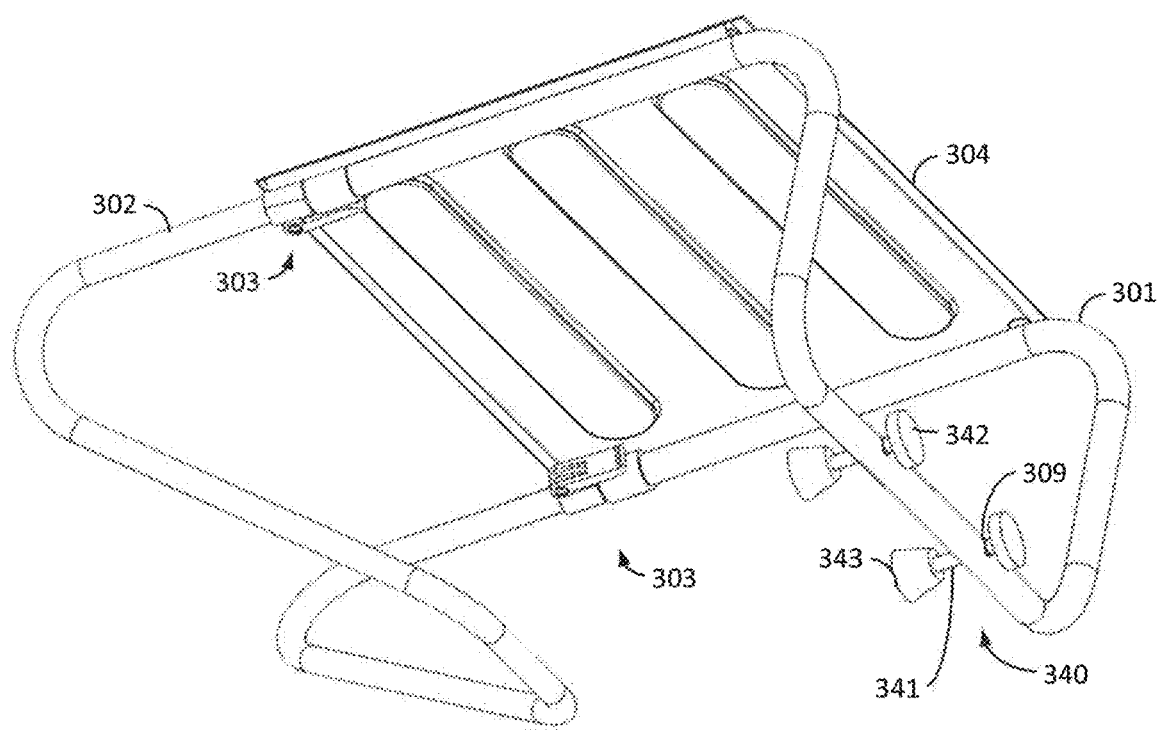
FIGS. 7A-7G illustrate various views of another example of the an apparatus for supporting an object at an opening of a structure.
Figure 7B:
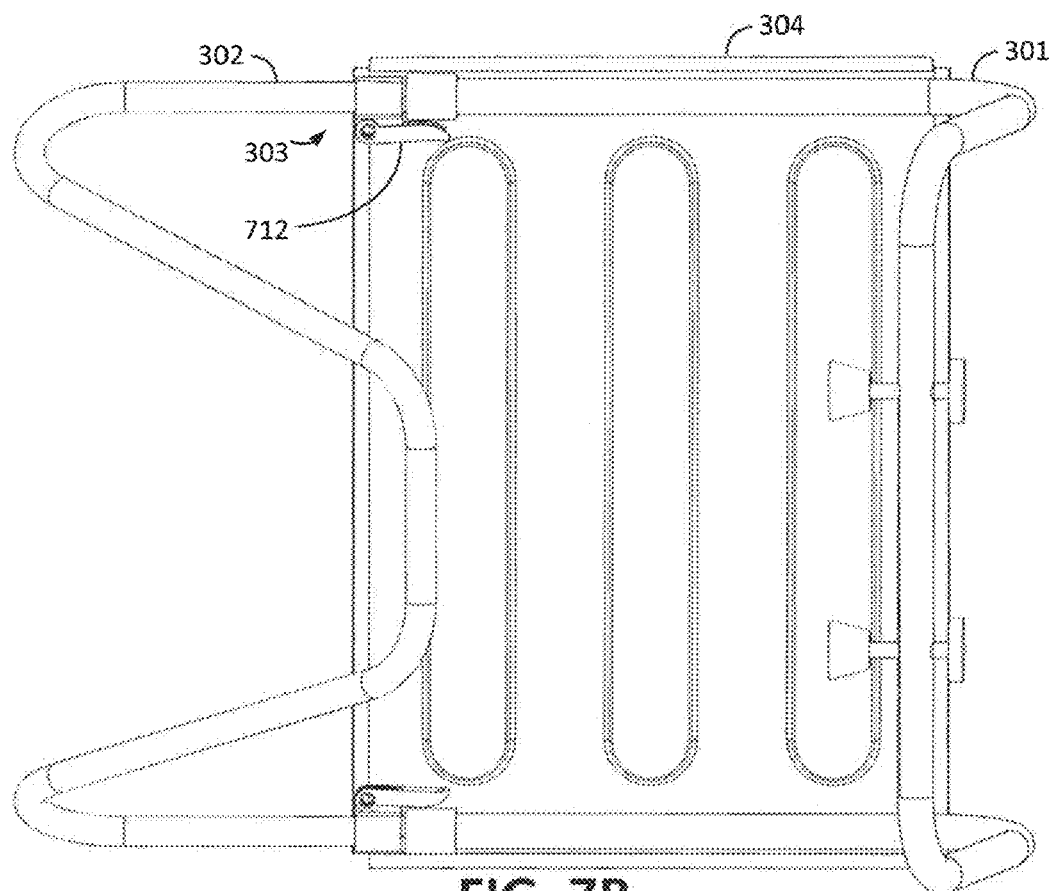
Figure 7E:
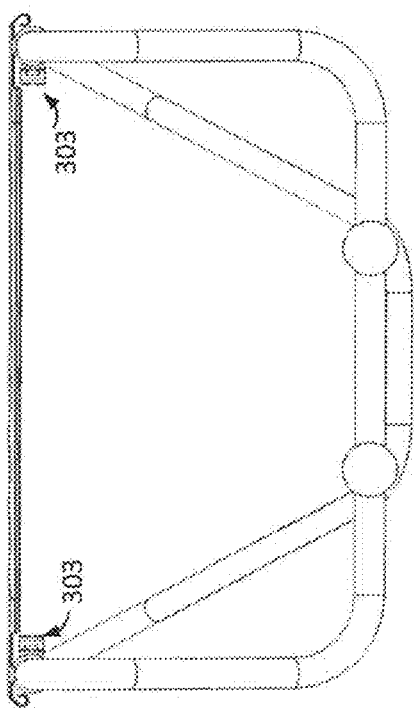
Figure 7F:
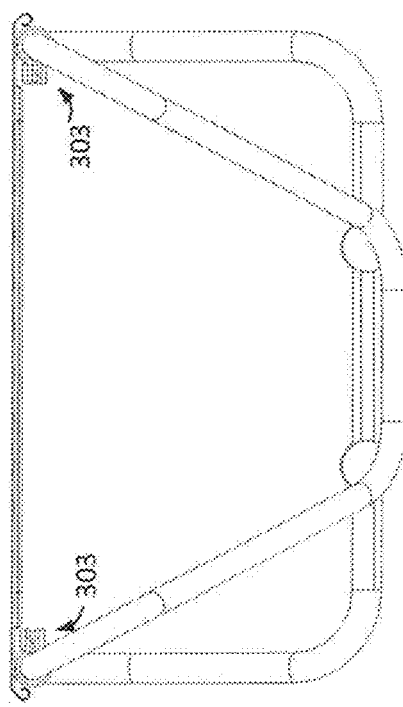
Figure 7C:
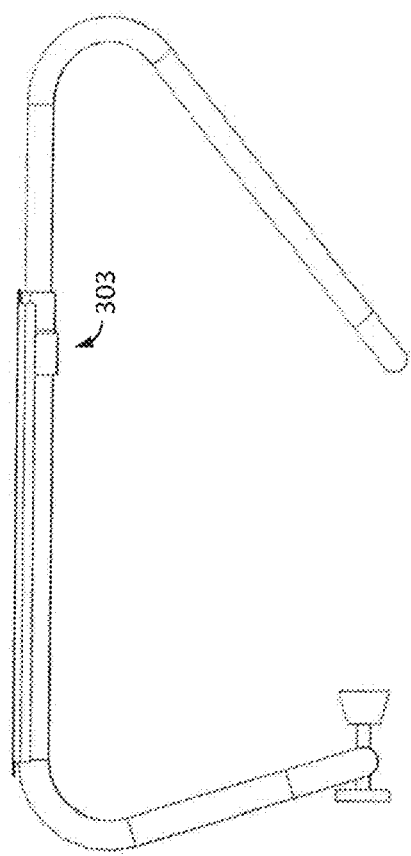
Figure 7D:
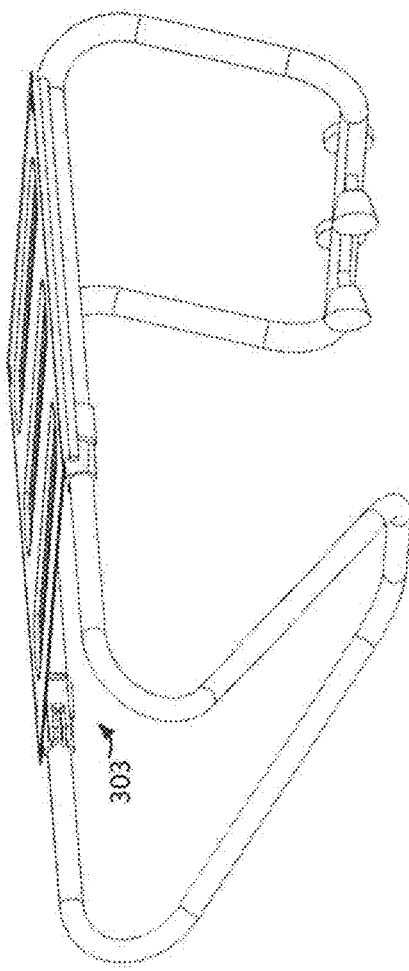
Figure 7G:
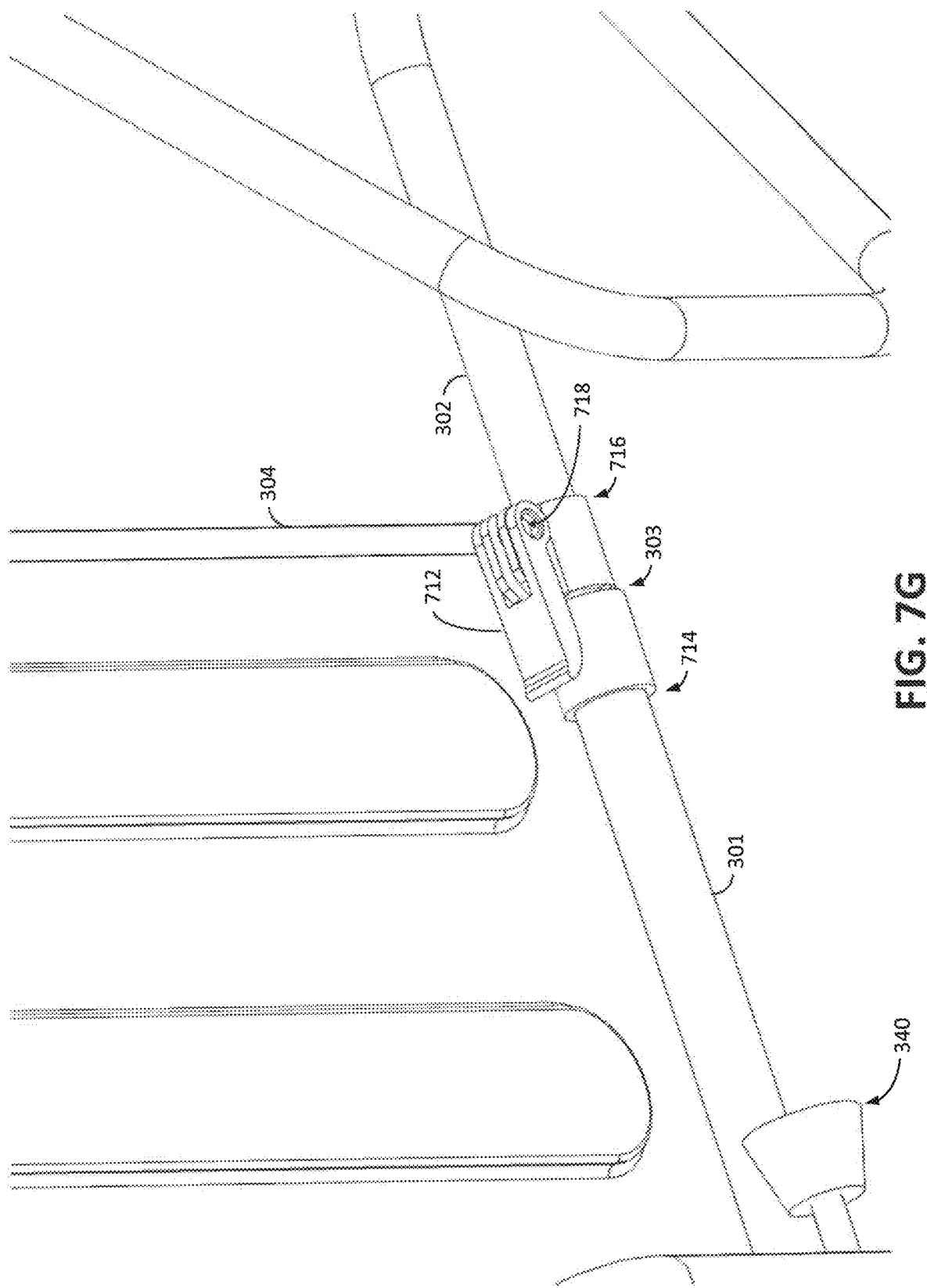

Referring to FIGS. 7A-7G, aspects of another example of an apparatus (e.g., 300) for supporting an object at an opening of a structure. The object may include or correspond to the object 120 of FIG. 1 or the object 220 of FIG. 2. FIG. 7A shows a perspective view of the apparatus, FIG. 7B shows a bottom view of the apparatus, FIG. 3C shows a side view of the apparatus, FIG. 3D shows another perspective view of the apparatus, FIG. 3E shows a rear view of the apparatus, FIG. 7F shows a front view of the apparatus, and FIG. 7G shown a view of a length adjustment mechanism 303 of the apparatus.

The apparatus of FIG. 7A-7G include a length adjustment mechanism 303. The length adjustment mechanism 303 may be coupled to the first member 301, the second member 302, or both. In some implementations, the length adjustment mechanism 303 comprises a telescoping tube clamp. The length adjustment mechanism 303 may include a first end 714 and a second end 716. The length adjustment mechanism 303 may be configured to be coupled to the first member 301 via the first end 714 and/or may be coupled to the second member 302 via the second end 716. Additionally, or alternatively, the length adjustment mechanism 303 comprises a lever 712 that may be configurable in a first position and in a second position. In some such implementations, when the lever 712 is configured in the first position (e.g., an open position), a position of the first member 301 relative to the second member 302 is adjustable, and when the lever 712 is configured in the second position (e.g. a lock position), a position of the first member 301 relative to the second member is secured 302. The lever 712 may be movable between the first and second positions by rotating about a rotation mechanism 718, such as a hinge, a screw, a pin, etc. As shown in FIG. 7G, the lever is shown in the second position.

Thus, FIGS. 7A-7G describe the apparatus (e.g., a support structure) that includes one or more braces 340 which may be adjusted to secure apparatus with respect to a structure 330. Additionally, or alternatively, the one or more braces 340 may provide adjustment (e.g., refined fitting adjustments) that would otherwise be unavailable in conventional support structures. Additionally, or alternatively, as compared to FIGS. 3A-3K, the length adjustment mechanism 303 of FIGS. 7A-7G provides a greater range of adjusting and/or securing the first member 301 with respect to the second member 302. To illustrate, the length adjustment mechanism 303 of FIGS. 7A-7G permits the second member 302 to slide over a range with respect to the first member 301, and enables the first member 301 to be secured with respect to the second member 302 over the range (e.g., an entirety of the range). For example, using the length adjustment mechanism 303 of FIGS. 7A-7G, securing the first member 301 with respect to the second member 302 may not be limited to various fixed positions, such as incremental positions, as described with reference to the length adjustment mechanism 303 of FIGS. 3A-3K.

Although one or more of the disclosed figures may illustrate systems, apparatuses, kits, methods, or a combination thereof, according to the teachings of the disclosure, the disclosure is not limited to these illustrated systems, apparatuses, kits, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein can be utilized according to the present examples. Accordingly, the appended claims are intended to include within their scope such processes, machines, manufacture, compositions of matter, means, methods, or steps

The invention claimed is:
1. An apparatus that, when installed at a window of a building, is configured to support an object at the window of the building, the apparatus comprising:
   two or more continuous members comprising a first member and a second member that, when coupled together, define:
      an interior section configured to be coupled to an interior surface of the building;
      an exterior section configured to be coupled to an exterior surface of building; and
      an intermediate section coupled to the interior section and to the exterior section, the intermediate section configured to extend from an interior of the building to an exterior of the building via the window; and
   a brace configured to extend through the first member, where the brace comprises:
      a first end configured to be coupled to the interior surface of the building; and
      a second end operable to adjust an amount that the brace extends through the first member; and
   wherein, when the apparatus is installed at the window of the building, a second portion of the second member extends toward the building at an angle from a first portion of the second member that extends toward the interior of the building, and the two or more continuous members are configured to support the object based on:
      a first force exerted on the interior surface via the interior section, and
      a second force exerted on the exterior surface via the exterior section.

2. The apparatus of claim 1, wherein the brace extends through the interior section and is configured to adjust a distance between the interior surface and the interior section, and wherein at least a portion of the first force is exerted on the interior surface by the brace.

3. The apparatus of claim 1, wherein the brace comprises:
   a shaft comprising a threaded portion, the shaft having a first and a second end;

an adjustment mechanism coupled to the first end of the shaft and configured to enable rotation of the shaft; and a foot coupled to the second end of the shaft and configured to contact the interior surface.

4. The apparatus of claim 1, wherein the first member is configured to extend at least along a partial width of the window.

5. The apparatus of claim 4, wherein:
the two or more continuous members further comprise a third member;
the first member has a first end and a second end;
the first end of the first member is configured to be coupled to the second member; and
the second end of the first member is configured to be coupled to the third member.

6. The apparatus of claim 5, further comprising:
a second brace configured to extend through the second member and having a first end configured to be coupled to the exterior surface of the building; and
a third brace configured to extend through the third member and having a first end configured to be coupled to the exterior surface of the building.

7. An apparatus comprising: two or more continuous members configured to support an object at an opening of a structure, where the two or more continuous members comprise a first member and a second member that, when coupled together, define: an interior section configured to be coupled to the structure via an interior surface of the structure; an exterior section configured to be coupled to the structure via an exterior surface of the structure; and an intermediate section coupled to the interior section and to the exterior section, the intermediate section configured to extend from an interior of the structure to an exterior of the structure via the opening; and a brace configured to extend through the first member, where the brace comprises: a first end configured to be coupled to the interior surface of the structure; and a second end operable to adjust an amount that the brace extends through the first member; and where, when the apparatus is installed at the opening of the structure, a second portion of the second member extends toward the structure at an angle from a first portion of the second member that extends toward the interior of the structure.

8. The apparatus of claim 7, wherein the brace comprises:
a shaft comprising a threaded portion, the shaft having a first and a second end;
an adjustment mechanism coupled to the first end of the shaft and configured to enable rotation of the shaft; and
a foot coupled to the second end of the shaft and configured to contact the interior surface of the structure.

9. The apparatus of claim 7, wherein:
the first member comprises an aperture; and
the brace extends through the aperture.

10. The apparatus of claim 7, wherein:
the opening comprises a window;
the structure comprises a building.

11. The apparatus of claim 7, wherein: when the apparatus is installed at the opening of the structure, the two or more continuous members are configured to support the object based on: a first force exerted on the interior surface of the structure via the interior section, and a second force exerted on the exterior surface of the structure via the exterior section; the brace is configured to adjust a distance between the interior surface of the structure and the interior section; and at least a portion of the first force is exerted on the interior surface of the structure by the brace.

12. The apparatus of claim 7, further comprising a second brace coupled to the two or more continuous members and that extends through the second member.

13. The apparatus of claim 7, further comprising multiple support members coupled between a first end of the intermediate section and a second end of the intermediate section, the multiple support members configured to support the object and having a spacing between support members that is configurable by a user.

14. A kit for an apparatus that, when installed at a window of a building, is configured to support an object at the window of the building, the kit comprising: two or more continuous members comprising a first member and a second member that, when coupled together, define: an interior section configured to be coupled to an interior surface of the building; an exterior section configured to be coupled to an exterior surface of building; and an intermediate section coupled to the interior section and to the exterior section, the intermediate section configured to extend from an interior of the building to an exterior of the building via the window; wherein, when installed at the window, a second portion of the second member extends toward the building at an angle from a first portion of the second member that extends toward the interior of the building; and a brace configured to extend through the first member, where the brace comprises: a first end configured to be coupled to the interior surface of the building; and a second end operable to adjust an amount that the brace extends through the first member.

15. The kit of claim 14, further comprising:
a package that includes the one or more members and the brace; and
wherein
the first member and the second member are configured to be reversibly coupled to each other.

16. A method comprising: positioning, at a window of a building, an apparatus comprising two or more continuous members and at least one brace that extends through a first member of the two or more continuous members, the two or more continuous members comprising at least the first member and a second member; coupling an interior section of the apparatus to an interior surface of the building; coupling an exterior section of the apparatus to an exterior surface of the building, the apparatus further comprising an intermediate section coupled to the interior section and to the exterior section, the intermediate section configured to extend from an interior of the building to an exterior of the building via the window; and adjusting a position of the at least one brace with respect to the first member to adjust a distance between the interior section of the apparatus and the interior surface, wherein a second portion of the second member extends toward the building at an angle from a first portion of the second member that extends toward the interior of the building.

17. The method of claim 16, wherein adjusting the position of the at least one brace comprises:
contacting a first end of the brace to the interior surface of the building; and
rotating a second end of the brace.

18. The method of claim 16, wherein positioning the apparatus at the window of the building comprises:
positioning the intermediate section of the apparatus on a sill of the window.

* * * * *

UNITED STATES PATENT AND TRADEMARK OFFICE
CERTIFICATE OF CORRECTION

PATENT NO. : 11,149,903 B2  
APPLICATION NO. : 16/575201  
DATED : October 19, 2021  
INVENTOR(S) : Jason Darby Page 1 of 1

It is certified that error appears in the above-identified patent and that said Letters Patent is hereby corrected as shown below:

In the Specification

At Column 5, Line number 1, delete "farther" and replace with --further--.
At Column 12, Line number 40, delete "and/dr" and replace with --and/or--.
At Column 16, Line number 15, delete "inward threes" and replace with --inward forces--.
At Column 21, Line number 44, delete "shaft 341, in" and replace with --shaft 341. In--.
At Column 25, Line number 67, delete "length, in" and replace with --length. In--.

In the Claims

At Column 32, Claim number 15, Line number 31, delete "a package that includes the one or more members" and replace with --a package that includes the two or more continuous members--.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*